(12) United States Patent
Wassvik et al.

(10) Patent No.: US 8,542,217 B2
(45) Date of Patent: Sep. 24, 2013

(54) OPTICAL TOUCH DETECTION USING INPUT AND OUTPUT BEAM SCANNERS

(75) Inventors: Ola Wassvik, Lund (SE); Kennet Vilhelmsson, Ojersjoe (SE)

(73) Assignee: FlatFrog Laboratories AB, Lund (SE)

( * ) Notice: Subject to any disclaimer, the term of this patent is extended or adjusted under 35 U.S.C. 154(b) by 73 days.

(21) Appl. No.: 12/737,019

(22) PCT Filed: Jun. 22, 2009

(86) PCT No.: PCT/EP2009/057728
§ 371 (c)(1),
(2), (4) Date: Dec. 2, 2010

(87) PCT Pub. No.: WO2010/006885
PCT Pub. Date: Jan. 21, 2010

(65) Prior Publication Data
US 2011/0102374 A1 May 5, 2011

Related U.S. Application Data

(60) Provisional application No. 61/129,372, filed on Jun. 23, 2008.

(30) Foreign Application Priority Data

Jun. 23, 2008 (SE) ...................................... 0801467

(51) Int. Cl.
*G06F 3/042* (2006.01)
*G01B 11/14* (2006.01)

(52) U.S. Cl.
USPC .......................... 345/175; 178/18.09; 356/614

(58) Field of Classification Search
USPC .................. 345/173–178; 178/18.01–18.11; 359/202.1–204.5; 356/399, 400, 601, 607, 356/608, 614, 621, 638–640
See application file for complete search history.

(56) References Cited

U.S. PATENT DOCUMENTS

| 3,553,680 | A |   | 1/1971 | Cooreman |          |
|-----------|---|---|--------|----------|----------|
| 3,673,327 | A | * | 6/1972 | Johnson et al. | 178/18.04 |

(Continued)

FOREIGN PATENT DOCUMENTS

| CN | 101075168 | 11/2007 |
| EP | 0 897 161 | 2/1999 |

(Continued)

OTHER PUBLICATIONS

U.S. Office Action issued Apr. 24, 2012 in U.S. Appl. No. 12/737,018.

(Continued)

*Primary Examiner* — Amare Mengistu
*Assistant Examiner* — Steven Holton
(74) *Attorney, Agent, or Firm* — Harness, Dickey & Pierce, P.L.C.

(57) ABSTRACT

An apparatus is controlled to detect a location of an object on a touch surface of a panel. An input scanner arrangement introduces at least two beams of radiation into the panel for propagation by internal reflection, and sweeps the beams inside the panel across a sensing area. An output scanner arrangement is synchronized with the input scanner arrangement so as to receive the beams from the input scanner arrangement while they are swept across the sensing area and to direct the beams onto at least one radiation detector. Thereby, each beam is introduced and received on opposite ends of the sensing area. A data processor is connected to the radiation detector and operated to identify the location based on an attenuation of the beams caused by the object touching the touch surface within the sensing area.

17 Claims, 15 Drawing Sheets

(56) References Cited

U.S. PATENT DOCUMENTS

| | | | |
|---|---|---|---|
| 4,129,384 A * | 12/1978 | Walker et al. | 356/640 |
| 4,213,707 A * | 7/1980 | Evans, Jr. | 356/640 |
| 4,294,543 A * | 10/1981 | Apple et al. | 356/621 |
| 4,420,261 A | 12/1983 | Barlow et al. | |
| 4,507,557 A * | 3/1985 | Tsikos | 250/341.7 |
| 4,521,112 A * | 6/1985 | Kuwabara et al. | 356/621 |
| 4,746,770 A | 5/1988 | McAvinney | |
| 5,383,022 A * | 1/1995 | Kaser | 356/640 |
| 5,570,181 A | 10/1996 | Yasuo et al. | |
| 6,492,633 B2 * | 12/2002 | Nakazawa et al. | 250/221 |
| 6,972,753 B1 | 12/2005 | Kimura et al. | |
| 7,629,968 B2 * | 12/2009 | Miller et al. | 345/173 |
| 2002/0067348 A1 | 6/2002 | Masters et al. | |
| 2003/0160155 A1 | 8/2003 | Liess | |
| 2004/0174541 A1 | 9/2004 | Freifeld | |
| 2004/0252091 A1 | 12/2004 | Ma et al. | |
| 2006/0017709 A1 | 1/2006 | Okano | |
| 2006/0114237 A1 | 6/2006 | Crockett et al. | |
| 2006/0227120 A1 | 10/2006 | Eikman | |
| 2007/0052684 A1 | 3/2007 | Gruhlke et al. | |

FOREIGN PATENT DOCUMENTS

| | | |
|---|---|---|
| EP | 1 752 864 | 2/2007 |
| GB | 2 131 544 | 6/1984 |
| WO | WO 01/84251 | 11/2001 |
| WO | WO 2006/095320 | 9/2006 |
| WO | WO 2007/112742 | 10/2007 |
| WO | WO 2008/039006 | 4/2008 |
| WO | WO 2008/068607 | 6/2008 |
| WO | WO 2009/048365 | 4/2009 |
| WO | WO 2010/006882 | 1/2010 |
| WO | WO 2010/006883 | 1/2010 |
| WO | WO 2010/006884 | 1/2010 |
| WO | WO 2010/006886 | 1/2010 |

OTHER PUBLICATIONS

U.S. Office Action issued Aug. 24, 2012 in U.S. Appl. No. 12/737,016.

Liu J., et al., "Multiple touch points identifying method, involves starting touch screen, driving specific emission tube, and computing and transmitting coordinate of touch points to computer system by direct lines through interface of touch screen", vol. 2008, No. 28, Nov. 21, 2007.

International Search Report dated Jan. 4, 2011 for International application No. PCT/EP2009/057731.

International Search Report dated Oct. 7, 2011 for International application No. PCT/EP2009/057725.

International Search Report dated Oct. 15, 2010 for International application No. PCT/EP2009/057724.

International Search Report dated Oct. 7, 2010 for International application No. PCT/EP2009/057728.

International Search Report dated Feb. 11, 2010 for International application No. PCT/EP2009/057723.

U.S. Office Action dated Feb. 27, 2013 issued in U.S. Appl. No. 12/737,018.

\* cited by examiner

OPTICAL TOUCH DETECTION USING INPUT AND OUTPUT BEAM SCANNERS

CROSS-REFERENCE TO RELATED APPLICATIONS

The present application claims the benefit of Swedish patent application No. 0801467-2, filed on Jun. 23, 2008, and U.S. provisional application No. 61/129,372, filed on Jun. 23, 2008, both of which are incorporated herein by reference.

TECHNICAL FIELD

The present invention relates to techniques for detecting the location of an object on a touch surface. The touch surface may be part of a touch-sensitive panel.

BACKGROUND ART

To an increasing extent, touch-sensitive panels are being used for providing input data to computers, electronic measurement and test equipment, gaming devices, etc. The panel may be provided with a graphical user interface (GUI) for a user to interact with using e.g. a pointer, stylus or one or more fingers. The GUI may be fixed or dynamic. A fixed GUI may e.g. be in the form of printed matter placed over, under or inside the panel. A dynamic GUI can be provided by a display screen integrated with, or placed underneath, the panel or by an image being projected onto the panel by a projector.

There are numerous known techniques for providing touch sensitivity to the panel, e.g. by using cameras to capture light scattered off the point(s) of touch on the panel, or by incorporating resistive wire grids, capacitive sensors, strain gauges, etc into the panel.

US2004/0252091 discloses an alternative technique which is based on frustrated total internal reflection (FTIR). Light from two spaced-apart light sources is coupled into a panel to propagate inside the panel by total internal reflection. The light from each light source is evenly distributed throughout the entire panel. Arrays of light sensors are located around the perimeter of the panel to detect the light from the light sources. When an object comes into contact with a surface of the panel, the light will be locally attenuated at the point of touch. The location of the object is determined by triangulation based on the attenuation of the light from each source at the array of light sensors.

U.S. Pat. No. 3,673,327 discloses a similar technique in which arrays of light beam transmitters are placed along two edges of a panel to set up a grid of intersecting light beams that propagate through the panel by internal reflection. Corresponding arrays of beam detectors are placed at the opposite edges of the panel. When an object touches a surface of the panel, the beams that intersect at the point of touch will be attenuated. The attenuated beams on the arrays of detectors directly identify the location of the object.

These known FTIR techniques suffer from being costly, i.a. since they require the use of a large number of detectors, and possibly a large number of light sources. Furthermore, they are not readily scalable since the required number of detectors/sources increases significantly with the surface area of the panel. Also, the spatial resolution of the panel is dependent on the number of detectors/sources. Still further, the energy consumption for illuminating the panel may be considerable and increases significantly with increasing surface area of the panel.

SUMMARY OF THE INVENTION

It is an object of the invention to at least partly overcome one or more of the above-identified limitations of the prior art.

This and other objects, which will appear from the description below, are at least partly achieved by means of apparatus, methods and a computer program product according to the independent claims, embodiments thereof being defined by the dependent claims.

A first aspect of the invention is an apparatus for detecting a location of at least one object on a touch surface, said apparatus comprising: a panel defining the touch surface and an opposite surface; an input scanner arrangement adapted to introduce at least two beams of radiation into the panel for propagation by internal reflection between the touch surface and the opposite surface, and to sweep the beams along the touch surface across a sensing area of the panel; an output scanner arrangement which is synchronized with the input scanner arrangement so as to receive the beams from said input scanner arrangement while they are swept across the sensing area and to direct the beams onto at least one radiation detector; wherein said input and output scanner arrangements are configured to introduce and receive each beam on opposite ends of said sensing area; said apparatus further comprising a data processor connected to said at least one radiation detector and configured to identify said location based on an attenuation of said beams caused by the object touching the touch surface within said sensing area.

A second aspect of the invention is an apparatus for detecting a location of at least one object on a touch surface, said touch surface being part of a panel that defines the touch surface and an opposite surface, said apparatus comprising: means for introducing at least two beams of radiation into the panel for propagation by internal reflection between the touch surface and the opposite surface; means for sweeping the beams along the touch surface across a sensing area of the panel; means for receiving the beams at an opposite end of the sensing area and, synchronously with said sweeping, directing the beams onto at least one radiation detector; and means for identifying said location based on an attenuation of said beams caused by the object touching the touch surface within said sensing area, said attenuation being identifiable from an output signal of the radiation detector.

A third aspect of the invention is a method of detecting a location of at least one object on a touch surface, said method comprising: introducing at least two beams of radiation into a panel that defines the touch surface and an opposite surface, said beams propagating by internal reflection between the touch surface and the opposite surface; sweeping the beams along the touch surface across a sensing area of the panel; receiving the beams at an opposite end of the sensing area and, synchronously with said sweeping, directing the beams onto at least one radiation detector; and identifying said location based on an attenuation of said beams caused by the object touching the touch surface within said sensing area, said attenuation being identifiable from an output signal of the radiation detector.

A fourth aspect of the invention is a method of operating an apparatus for detecting a location of at least one object on a touch surface, said touch surface being part of a panel that defines the touch surface and an opposite surface, said method comprising: operating an input scanner arrangement to introduce at least two beams of radiation into the panel for propagation by internal reflection between the touch surface and the opposite surface, and to sweep the beams along the touch surface across a sensing area of the panel; operating an output scanner arrangement in synchronization with the input scanner arrangement so as to receive the beams at an opposite end of the sensing area while they are swept across the sensing area and to direct the beams onto at least one radiation detector; and identifying said location based on an attenuation of said beams caused by the object touching the touch surface within said sensing area, said attenuation being identifiable from an output signal of the radiation detector.

A fifth aspect of the invention is a computer program product comprising computer code which, when executed on a data-processing system, is adapted to carry out the method according to the fourth aspect.

Still other objectives, features, aspects and advantages of the present invention will appear from the following detailed description, from the attached claims as well as from the drawings.

BRIEF DESCRIPTION OF DRAWINGS

Embodiments of the invention will now be described in more detail with reference to the accompanying schematic drawings.

DETAILED DESCRIPTION OF EXAMPLE EMBODIMENTS

Figure 1A:
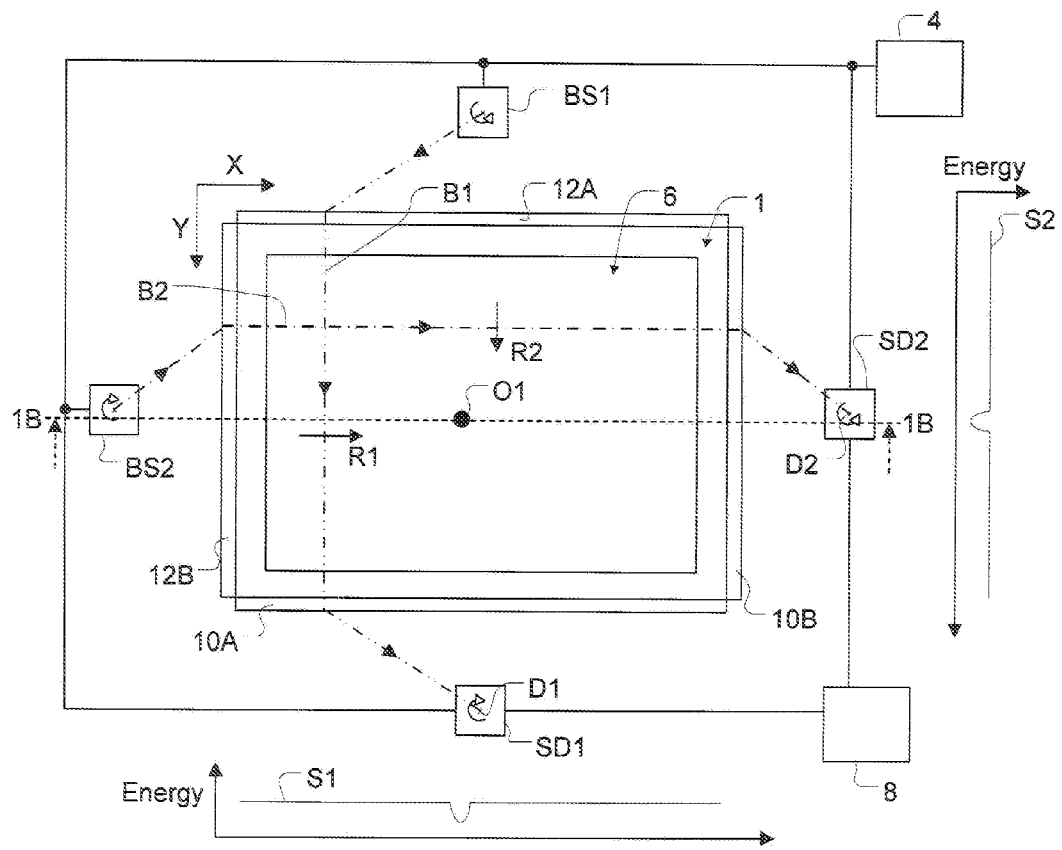
FIG. 1A is a top plan view of an embodiment of a touch-sensing system, and includes graphs of measurement signals generated in the system.

The following description starts by describing features that are relevant to many embodiments of the present invention. Thereafter, a number of specific embodiments are described in more detail. Throughout the description, the same reference numerals are used to identify corresponding elements.

General

The present invention relates to a technique for detecting the location of a point-of-touch on a surface of a radiation transmissive panel. An example of a touch-sensing system including such a panel 1 is shown in the top plan view of FIG. 1A and the section view of FIG. 1B (taken along line 1B-1B in FIG. 1A). The panel 1 defines two opposite and generally parallel surfaces 2, 3 and may be planar or curved. The panel 1 is configured to allow radiation to propagate inside the panel by internal reflection. To this end, a radiation propagation channel is provided between two boundary surfaces of the panel, wherein at least one of the boundary surfaces allows the propagating radiation to interact with a touching object O1. In this interaction, part of the radiation may be scattered by the object O1, part of the radiation may be absorbed by the object O1, and part of the radiation may continue to propagate unaffected. Thus, when the object O1 touches a surface of the panel 1 (e.g. the top surface 2), the energy of the transmitted radiation is decreased. By measuring the energy of the radiation transmitted through the panel 1 from a plurality of different directions, the location of the touching object ("touch location") may be detected, e.g. by triangulation.

Typically, the panel 1 is made of solid material, in one or more layers. The internal reflections in the touch surface are caused by total internal reflection (TIR), resulting from a difference in refractive index between the material of the panel and the surrounding medium, typically air. The reflections in the opposite boundary surface may be caused either by TIR or by a reflective coating applied to the opposite boundary surface. The total internal reflection is sustained as long as the radiation is injected into the panel 1 at an angle to the normal of the panel which is larger than the critical angle at the injection site of the panel. The critical angle is governed by the refractive indices of the material receiving the radiation at the injection site and the surrounding material, as is well-known to the skilled person. The above-mentioned process of interaction between the touching object O1 and the propagating radiation may involve so-called frustrated total internal reflection (FTIR), in which energy is dissipated into the object O1 from an evanescent wave formed by the propagating radiation, provided that the object O1 has a higher refractive index than the material surrounding the panel surface material and is placed within less than several wavelengths distance from the surface 2. Generally, the panel 1 may be made of any material that transmits a sufficient amount of radiation in the relevant wavelength range to permit a sensible measurement of transmitted energy. Such material includes glass, poly(methyl methacrylate) (PMMA) and polycarbonates (PC).

As shown in FIG. 1A, radiation is introduced into the panel 1 in the form of a number of non-parallel beams B1, B2. Each beam B1, B2 is swept or scanned across a touch-sensing area of the panel by a beam scanner BS1, BS2. The touch-sensing area ("sensing area") is defined as the surface area of the panel that is swept by at least two beams. As will be further explained in the following, the location of an object O1 that touches the panel 1 (i.e. the touch location) can be determined if the object O1 affects at least two non-parallel beams B1, B2 while these are swept across the panel. Each beam B1, B2 is preferably narrow in its sweep direction R1, R2 and wide perpendicularly thereto, i.e. in the depth direction of the panel. After passing the sensing area, each beam B1, B2 is out-coupled from the panel 1 and received by a scanning detector SD1, SD2, which includes a radiation detector for measuring the beam energy. A control device 4 may be connected to operate each pair of a beam scanner BS1, BS2 and a scanning detector SD1, SD2 in mutual synchronization. Alternatively, the system may include a mechanical arrangement for synchronizing the beam scanners and the scanning detectors.

Generally, the beam scanners can operate in any suitable wavelength range, e.g. in the infrared or visible wavelength region. All beams could be generated with identical wavelength. Alternatively, different beams could be generated with radiation in different wavelength ranges, permitting differentiation between the beams based on wavelength. Furthermore, the beam scanners can output either continuous or pulsed radiation.

The beams could be generated by one or more radiation sources, which can be any type of device capable of emitting radiation in a desired wavelength range, for example a diode laser, a VCSEL (vertical-cavity surface-emitting laser), or alternatively an LED (light-emitting diode), an incandescent lamp, a halogen lamp, etc.

The energy of the beams may be measured by any type of radiation detector capable of converting radiation into an electrical signal. Such a radiation detector may have any number of radiation-sensitive elements and may thus be a 0-dimensional, 1-dimensional (1D) or 2-dimensional (2D) detector. One detector may be used to measure the energy of a single beam, or the individual energy of plural beams. In certain embodiments, the detector may be a photo detector with only one radiation-sensitive element, which may have a large detection surface, resulting in low detection noise. Furthermore, photo detectors are presently cheap in comparison with other detectors. In another variant, a 0- or 1-dimensional detector is formed by appropriate binning of the radiation-sensitive elements (pixels) of a two-dimensional detector such as a CMOS sensor.

As will be further exemplified below, different combinations of beam scanners BS1, BS2 and scanning detectors SD1, SD2 may be used to sweep the beams B1, B2 across the sensing area. For example, the system may be configured such that one beam scanner is used to sweep more than one beam, and/or one scanning detector is used to receive more than one of the swept beams. Thus, on a general level, the system includes an input scanner arrangement for introducing the beams into the panel and for sweeping the beams across the sensing area, and an output scanner arrangement which is synchronized with the input scanner arrangement so as to receive the beams from the input scanner arrangement while they are swept across the sensing area and to direct the beams onto at least one radiation detector.

In the example of FIG. 1, the system also includes an interface device 6 that provides a graphical user interface (GUI) within at least part of the sensing area. The interface device 6 may be in the form of a substrate with a fixed image that is arranged over, under or within the panel 1. Alternatively, the interface device 6 may be a screen arranged underneath or inside the system, or a projector arranged underneath or above the system to project an image onto the panel 1. Such an interface device 6 may provide a dynamic GUI, similar to the GUI provided by a computer screen.

Figure 1B:
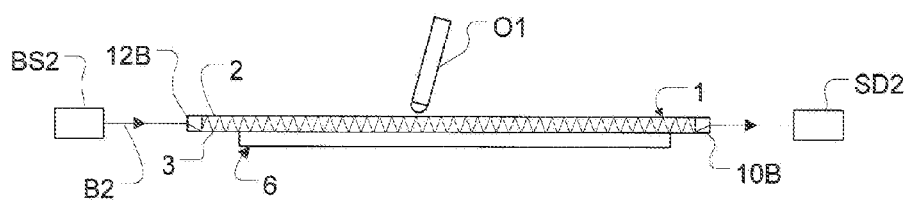
FIG. 1B is a section view of the system in FIG. 1A.

In the example of FIG. 1, the system operates by causing the beam scanners BS1, BS2 to sweep one beam B1 horizontally (X direction) across the panel 1 and another beam B2 vertically (Y direction) across the panel 1. The bottom portion and right-hand portion of FIG. 1B contain graphs that illustrate measurement signals S1, S2 that represent the energy of beams B1, B2 as measured by the respective scanning detector SD1, SD2 during a sweep. The signals may indicate measured energy as a function of time, sweep angle or X/Y position in a given coordinate system with respect to the panel 1. As shown, the touching object O1 results in a local decrease in measured beam energy for each sweep. The scanning detectors SD1, SD2 are connected to a data processor 8, e.g. a computer, which calculates the location of the object O1 based on the measured energy signals, e.g. by reconstructing the beams that correspond to the local decrease in the signals S1, S2 and by identifying the intersection of these beams.

Generally, the data processor 8 is configured to determine the position of one or more objects touching the panel based on the output signals of the scanning detectors for each sensing instance. A sensing instance is formed when all beams has been swept once across the sensing area. The temporal resolution of the system is determined by the update frequency, which is the frequency of sensing instances. For example, for a system designed for recording of handwriting, it may be desirable to have an update frequency of at least 75 Hz, whereas other applications may require a lower or higher temporal resolution.

In all embodiments, the beams may be swept sequentially across the sensing area within a sensing instance. Alternatively, two or more beams may be swept wholly or partly simultaneously across the sensing area during a sensing instance. Preferably, each beam is swept in a continuous movement across the sensing area.

In the example of FIG. 1, the scanning detector SD1, SD2 may include a detector which is controlled to move along the periphery of the panel 1 in a translation movement synchronized with the movement of the beam B1, B2 across the sensing area. However, for reasons of system complexity, size and precision, the detector is preferably not translated. Instead, as indicated in FIG. 1, a fixed re-directing element 10A, 10B may be arranged to receive and re-direct the incoming beam B1, B2 onto a common detection point D1, D2 while the beam B1, B2 is swept across the sensing area. To reduce the size of the touch-sensing system, the re-directing element 10A, 10B may be placed near a periphery portion of the panel 1. For reasons of robustness and mounting precision, the re-directing element 10A, 10B may be mounted in contact with such a periphery portion. Non-limiting examples of suitable re-direction elements include diffractive optical elements (DOE), micro-optical elements, mirrors, refractive lenses and any combination thereof.

The energy of the incoming beam may be measured by a stationary radiation detector in the detection point D1, D2. It may be desirable for the radiation detector to have a small view angle, in order to obtain an adequate precision in determining the touch location. This is due to the fact that irregularities in the panel may cause the beam to be scattered while it propagates through the panel, causing the beam to be broadened in the plane of the panel as a function of distance from the injection site. A small view angle of the detector will limit the detection to a confined region around the main direction of the beam B1, B2, thereby increasing the precision in locating the energy decrease caused by the touching object O1. For example, it may be desirable for the confined region to be about 10 mm, and typically in the approximate range of 1-50 mm, at the outcoupling site on the touch panel (e.g., at the edge of the panel). In order to accommodate for the varying directions of the incoming beam during the sweep, the scanning detector SD1, SD2 may be configured to scan its field of view in synchronization with the beam sweep. This allows the detector to be configured with a small view angle.

Figure 1C:
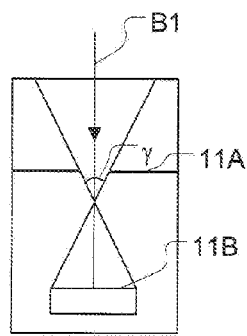
FIG. 1C is a top plan view of a radiation detector that may be included in the system of FIG. 1A.

FIG. 1C illustrates an exemplifying configuration of a radiation detector that may be included in a scanning detector according to any embodiment described herein. The detector may be preconfigured or controllable to provide an adequate view angle γ. The detector includes an aperture stop 11A and radiation-sensing element(s) 11B. The aperture stop 11A is spaced from the radiation-sensing element(s) 11B so as to define the view angle γ. The detector may be adjustable/controllable to change the view angle γ by changing the distance between the aperture stop 11A and the radiation-sensing element(s) 11B, and/or by changing the size of the opening in the aperture stop 11A or the extent of the radiation-sensing element(s) 11B, or both. Further optical elements may be arranged on either side of the aperture stop 11A to improve the detector performance.

The field of view may be scanned mechanically by rotating the radiation detector in FIG. 1C around the common detection point D1, D2. Again, for reasons of complexity, size and precision, it may be undesirable to rotate the entire detector. Instead, a movable deflection element may be arranged at the common detection point D1, D2 to deflect the incoming beam B1, B2 onto a stationary radiation detector, as will be further exemplified below.

Such a movable deflection element may be any type of element or combination of elements that is/are capable of deflecting a beam of radiation a certain number of degrees. This number of degrees depends on the geometry of the system but generally lie in the range from 1° to 90°. Non-limiting examples of such deflection elements include rotating mirrors, resonant mirrors, galvanometer mirrors, dispersive prisms in combination with tunable light sources, MEMS (Micro-Electro-Mechanical Systems), MOEMS (Micro Opto-Electrical-Mechanical Systems), etc.

According to yet another alternative, the scanning detector SD1, SD2 may be configured to scan its field of view electronically. For example, an array of radiation-sensitive elements (pixels), e.g. in the form of a 1D detector, may be arranged parallel to the panel edge that is swept by the beam (cf. the vertical edge to the right in FIG. 1A). An array of microlenses and pinholes may be arranged in front of the detector so that defined parts (e.g. one or more pixels) of the detector has a confined field of view that covers only a small portion of the panel edge. The array of microlenses and pinholes, or an equivalent element, may replace or supplement the above-mentioned re-directing element (10B in FIG. 1). The detector is synchronized with the beam scanner by the pixels being read out sequentially in coordination with the beam sweep across the panel edge, such that only the detector part that views the instant area illuminated by the beam will give a signal value for that beam position. Thus, the pixels are read out one by one until the beam sweep is completed with the last pixel being read, whereupon the scan may re-start at the first pixel of the detector.

In all embodiments, by using a combination of mutually synchronized beam scanners BS1, BS2 and scanning detectors SD1, SD2, only a small number of radiation sources and detectors are required to detect the location of an object O1 on the surface 2, 3 of the panel 1. Furthermore, the number of sources/detectors is not dependent on the surface area of the panel, and thus the touch-sensing system is readily scalable.

Compared to prior art techniques with constant illumination of the entire panel, the use of beam scanners BS1, BS2 allows for a lower power consumption for a given signal-to-noise ratio since only a small part of the panel 1 is illuminated at a time. Furthermore, the spatial resolution of the touch-sensing system is given by the sampling rate of the scanning detectors SD1, SD2, i.e. the rate at which measurement data is sampled from each detector. This means that any desired resolution can be achieved, provided that sufficient amount of radiation is introduced into the panel 1. Furthermore, the spatial resolution can be varied during operation of the touch-sensing system, and different spatial resolution can be achieved in different parts of the sensing area.

An alternative solution has been developed by the present Applicant and proposed in WO 2009/048365, which is incorporated herein by reference. According to this previous solution, which is likewise based on injecting beams of radiation into a panel for propagation by internal reflection, two or more optical transceivers are arranged to scan at least two non-parallel beams across the sensing area. Retro-reflectors are arranged along the perimeter of the panel to reflect the scanning beams back towards the respective transceiver, which includes a detector for measuring the energy of the returning beam. Compared to such a solution in which the beams traverse the panel twice between injection and detection, the inventive concept as exemplified in the foregoing requires the beams to traverse the panel only once, since the beam scanners and the scanning detectors are arranged to introduce and receive the beams from opposite ends of the sensing area. Thus, the inventive concept reduces the distance that the beams travel inside the plate by 50%. One result is that the broadening of the beams is reduced, which in turn improves the signal-to-noise ratio for a given panel and energy input. Alternatively, the energy input can be reduced or the size of the panel can be increased while retaining a given signal-to-noise ratio. Furthermore, the inventive concept may allow the panel to be manufactured in materials that otherwise could not have been used, e.g. materials with an undesirably high absorption of radiation at the relevant wavelength. For example, instead of using expensive super-white glass, an ordinary glass may be used, thereby reducing the cost of the system dramatically. Furthermore, in a system that uses retro-reflectors, the detector is co-located with the radiation source, possibly with a beam splitter being used to deflect the returned radiation onto the detector. The inventive concept makes it possible to dispense with a beam splitter, if so desired, and gives greater freedom in placing the detector, e.g. to reduce the footprint of the system.

Returning to the exemplifying system of FIG. 1, each beam B1, B2 is translated along a respective sweep direction R1, R2 across the sensing area. In such an arrangement, the spatial resolution is the same across the entire sensing area, if the same sampling rate is used during the entire sweep. In FIG. 1, a fixed beam-directing element 12A, 12B is arranged to receive the beam B1, B2 from the beam scanner BS1, BS2 and to cause the beam B1, B2 to be translated with an essentially invariant main direction while it is swept across the sensing area. Non-limiting examples of suitable beam-directing elements include diffractive optical elements (DOE), micro-optical elements, mirrors, refractive lenses and any combination thereof.

Furthermore, in FIG. 1, the sweep directions R1, R2 are approximately mutually orthogonal, with each beam B1, B2 being orthogonal to its sweep direction R1, R2. Thereby, the beams B1, B2 are parallel to the sides of the rectangular panel 1, and the sensing area is equal to the entire surface area of the panel 1.

Figure 2:
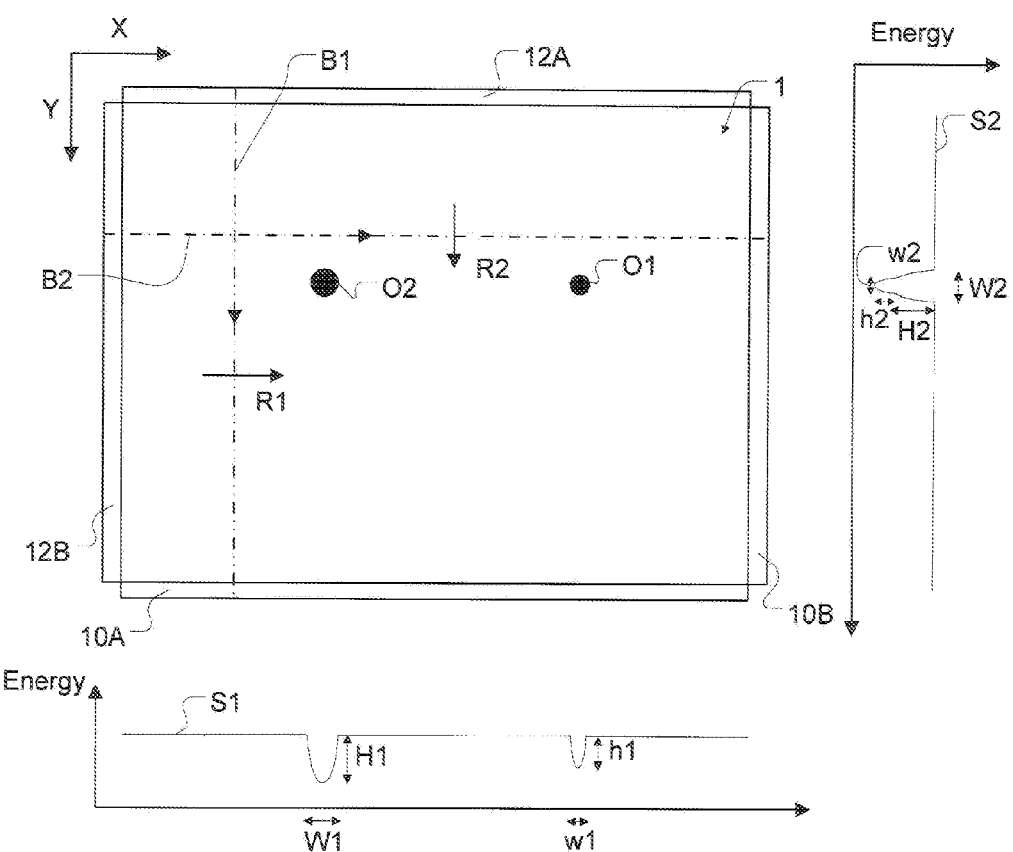
FIG. 2 is a top plan view of the system of FIG. 1A with two touching objects, and the corresponding measurement signals.

The touch-sensing system according to embodiments of the invention may be operated to determine the location of a plurality of objects touching the surface during a sensing instance ("multitouch"). As mentioned above, only part of the radiation is absorbed/scattered by an object, while the remaining radiation continues to propagate along the main direction of the beam. Thus, if two objects happen to be placed after each other in the main direction of a beam, part of the beam will interact with both objects. Provided that the beam energy is sufficient, a remainder the beam will reach the scanning detector and generate a measurement signal that allows both interactions to be identified. FIG. 2 shows the system of FIG. 1A where two objects O1, O2 are placed simultaneously (i.e. during one and the same sensing instance) within the sensing area of the panel 1, and the resulting measurement signals S1, S2. Object O1 is attributed to signal features w1 and h1 in signal S1 and signal features w2 and h2 in signal S2, whereas object O2 is attributed to signal features W1 and H1 in signal S1 and signal features W2 and H2 in signal S2. Signal features w1, w2, W1, W2 (width features) depend on the apparent size of the objects O1, O2. Signal features h1, h2, H1, H2 (energy features) depend on the absorptive/scattering properties of the objects O1, O2 as well as the size of the objects. Provided that the signals S1, S2 allow the data processor 8 (FIG. 1) to distinguish between the objects, their location in the sensing area can be determined.

In a system with negligible scattering, the ratio of energy absorbed by an object O1, O2 is independent of its distance to the detector. This means that a transmission signal detected on a detector will be independent of the distance between beam scanner, object and scanning detector, with the transmission signal being defined as a measurement signal with object divided by a background signal, e.g. a measurement signal without object. The transmission signal of two objects O1, O2 on the same detection line (cf. beam B2 in FIG. 2) is equal to the product of an individual transmission signal with only one object O1 and an individual transmission signal with only the other object O2. If there are more than two objects on the same detection line, the total transmission signal is the product of all individual transmission signals: $T=\Pi T_i$. This is true for any number of objects on any detection line, provided that a remainder of the beam reaches the detector.

The position determination may be simplified by operating on logarithms, since the logarithm of the total transmission signal is then equal to the sum of the logarithms of the individual transmission signals: $\log T = \Sigma \log T_i$. However, logarithms need not be used.

Figure 3:
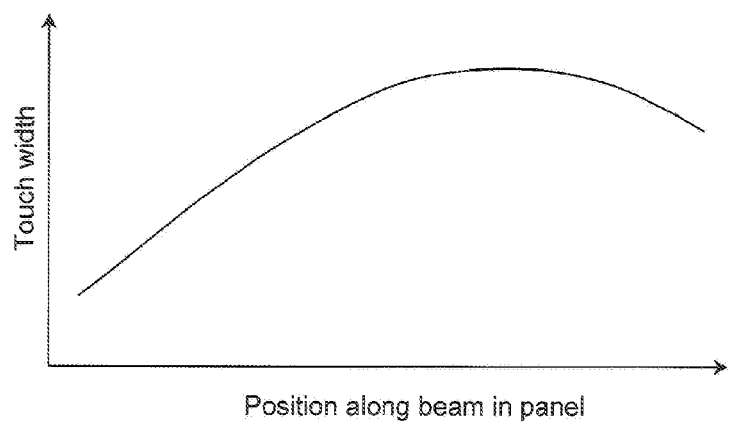
FIG. 3 is a graph of signal width as a function of touch location along a beam in a panel with a scattering surface.

If scattering is present in the system, the transmission signal of an object O1, O2 will depend on the location of the object along the main direction of a beam. Scattering is primarily caused by the beam being scattered each time it is reflected internally against the surfaces of the panel. This causes the beam to be broadened in the plane of the panel as the beam travels from the injection site through the panel. Thus, for each internal reflection, some radiation is diverted away from the main direction of the beam, and the centre of the beam looses energy with distance. Another effect is that scattered radiation from the broadened beam re-enters the beam behind a touching object. This effect is dependent on the distance between the object and the detector. The combined effects of broadening and re-entry generate a functional dependence between the signal width (cf. w1 and W1 in FIG. 2) in the measurement signal and the distance between the detector and the touching object. FIG. 3 illustrates an example of such a functional dependence, i.e. the measured signal width as a function of position along the beam for an object with a given size (width). Clearly, the measurement signals (e.g. S1, S2) will contain additional distance information, via the functional dependence. If the functional dependence is known or approximated, the additional distance information is the measurement signals may be utilized to facilitate and/or improve the position determination. The use of this functional dependence is further described in U.S. provisional application No. 61/202,208, filed on Feb. 5, 2009, which is incorporated herein by this reference.

Scattering is particularly noticeable if an anti-glare surface/layer is provided on one or both of the panel surfaces. The anti-glare surface/layer provides a diffusing structure which may enhance the scattering of the beam for each internal reflection, and which may also cause radiation to escape through the surface for each internal reflection. Thus, the provision of an anti-glare surface/layer generally increases the broadening of the beam with distance from the injection site. This will cause the above-mentioned transmission signal to depend on the distance between emitter and object as discussed above and indicated in FIG. 3.

The use of an anti-glare surface/layer may be advantageous to reduce glares from external lighting on the surface of the panel. Such glares might otherwise impair the ability of an external observer to view any information provided on the panel by the interface device (6 in FIG. 1). Furthermore, when the touching object is a naked finger, the contact between the finger and the panel normally leaves a finger print on the surface. On a perfectly flat surface, such finger prints are clearly visible and usually unwanted. By adding an anti-glare surface/layer to the surface, the visibility of fingerprints is reduced. Furthermore, the friction between finger and panel decreases when an anti-glare is used, thereby improving the user experience. Anti-glares are specified in gloss units (GU), where lower GU values result in less glares. In one embodiment, the touch surface(s) of the panel has a GU value of 10-200, preferably 100-120.

Exemplifying Beam Arrangements

In the following, alternative embodiments are generally described with reference to FIGS. 4-10. These figures focus on the beam arrangement with respect to the panel, and consequently most hardware components have been omitted. It is to be understood that the illustrated systems can be implemented by the same or a similar combination of components as described with reference to FIG. 1.

As will be further explained below, different beam arrangements within the panel may provide different characteristics to the touch-sensing system, e.g. with respect to the precision in detecting touch locations, the number of touch locations that can be detected within a sensing instance, the technical complexity of the system, the footprint of the system, the relative size of the multi-touch sensing area to the total surface area of the panel, etc.

In the illustrated beam arrangements, it is to be understood that the beams do not physically intersect over the entire panel. Instead, the points of intersection between beams can be reconstructed when each of the beams has been swept across the panel.

Furthermore, it is to be understood that the following discussion about beam directions refers to the main direction of each beam, which is a straight symmetry line that extends in the panel from the beam injection site, as seen in a planar view of the panel.

Still further, in the context of the present application, a "sweep direction" refers to a principal direction that includes a certain direction (R) and its opposite direction (−R).

In the Figures, a Cartesian coordinate system has been introduced, with the coordinate axes X, Y being parallel to the sides of the rectangular panel. This is only for the purpose of illustration, and the touch locations can be represented in any type of coordinate system, e.g. polar, elliptic, parabolic, etc.

Figure 4:
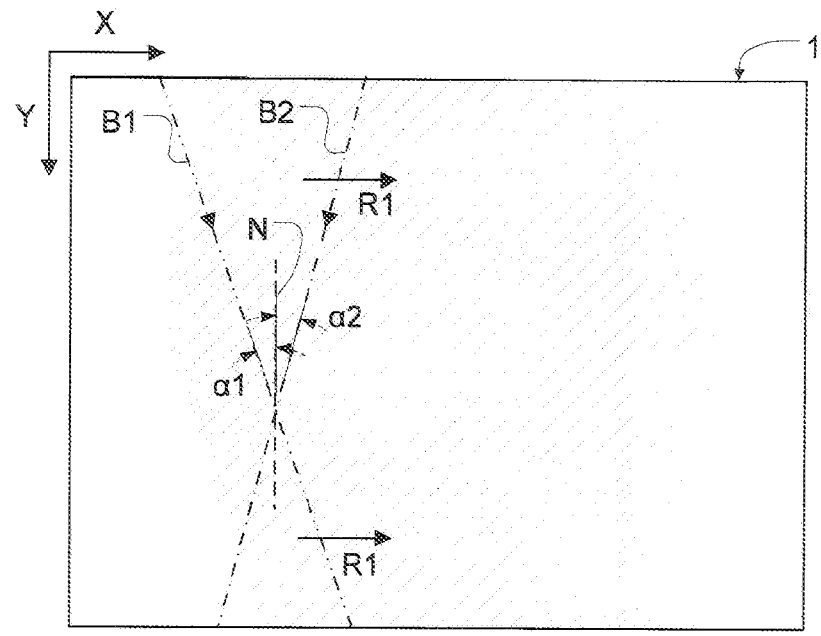
FIG. 4 is a top plan view of another embodiment.

In one beam arrangement, one or more of the beams is non-perpendicular to its sweep direction. Furthermore, the sweep direction may be the same for both beams. FIG. 4 illustrates an example of such a beam arrangement in which two non-parallel beams B1, B2 are translated in the same sweep direction R1 across a sensing area, the main direction of each beam defining a respective angle $\alpha 1$, $\alpha 2$ to the normal N of the sweep direction. This type of beam arrangement with two non-parallel beams B1, B2 that are swept in one and the same direction R1 across a sensing area is denoted "v-scan" in the following. In the illustrated embodiment, as well as in all other embodiments, the beams B1, B2 may be introduced from opposite sides of the sensing area or on the same side. In the illustrated v-scan embodiment, the sensing area (indicated by hatched lines) is a subset of the surface area of the panel 1.

Figure 5:
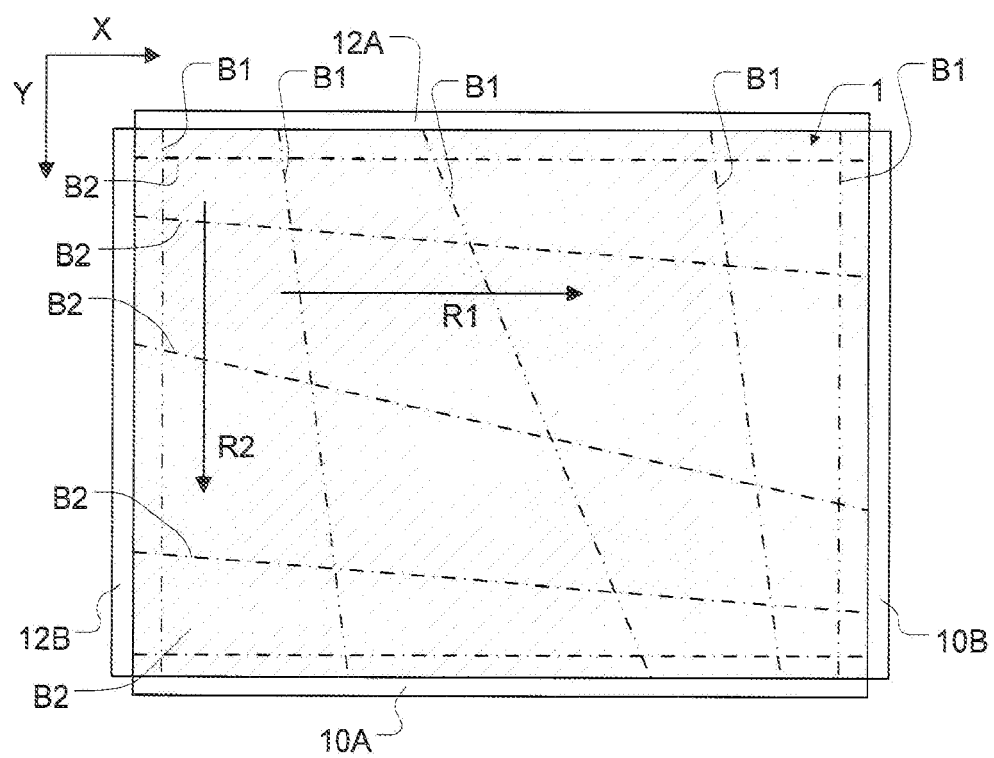
FIG. 5 is a top plan view of yet another embodiment.

In another embodiment, one or more of the beams B1, B2 is both translated and rotated during the sweep. This can e.g. be achieved by proper design of the beam-directing elements 12A, 12B in FIG. 1. In one example, shown in FIG. 5, the main direction of each beam is parallel to the periphery of the panel at the start and end of the sweep, and angled to the periphery therebetween. It should be noted that FIG. 5 illustrates plural instances of each beam B1, B2 as it is scanned across the sensing area.

The ability of the touch-sensing system to detect the location of a plurality of objects touching the sensing area within a sensing instance is improved by sweeping more than two beams across the sensing area. Example embodiments that enable this so-called "multi-touch" functionality will now be described with reference to FIGS. 6-10.

Figure 6A:
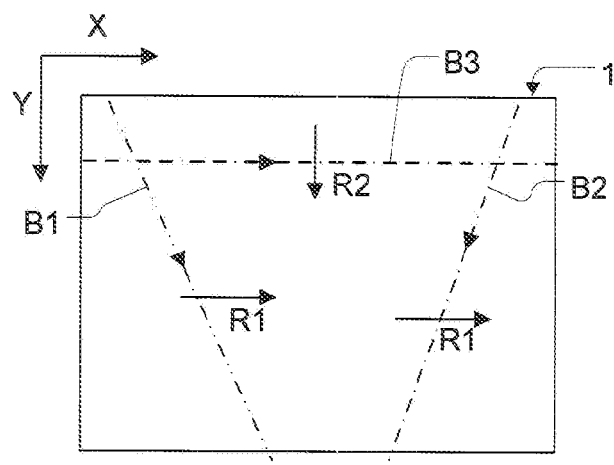
FIGS. 6A-6C are top plan views of yet another embodiment, with FIG. 6A illustrating beam sweeps, FIG. 6B illustrating the location of different sensing portions, and FIG. 6C illustrating the mutual beam angle between the beams.
Figure 6B:
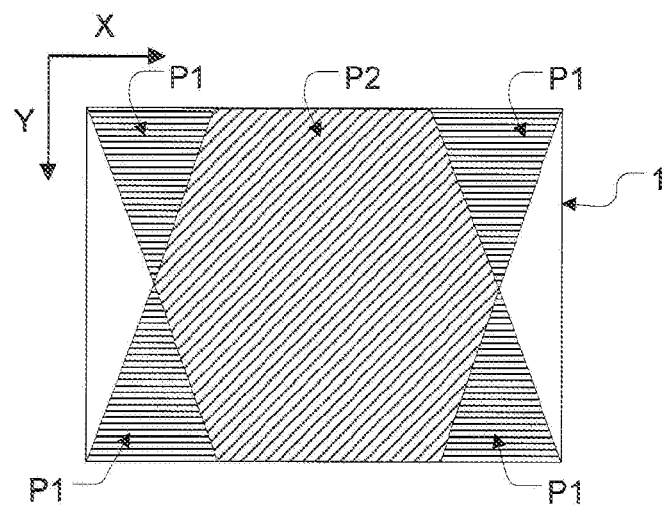
Figure 6C:
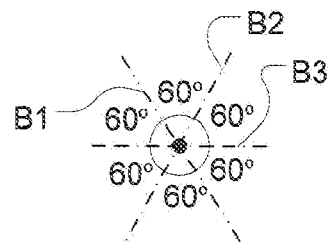

FIG. 6A-6C illustrates an embodiment in which three beams B1-B3 are swept across the sensing area. FIG. 6A shows that two non-parallel beams B1, B2 are translated in a first sweep direction R1, and a third beam B3 being swept in a second sweep direction R2 which is perpendicular to the first sweep direction.

In the illustrated example, the first and second sweep directions R1, R2 are parallel to the sides of the panel. This has been found to facilitate the design of the system. For example, as described in the foregoing, an elongate beam-directing element (e.g. 12A, 12B in FIG. 1) may be arranged along the side of the panel to define the main beam direction in the panel as a beam is swept along the beam-directing element. Thus, for a panel that is defined by linear periphery portions (sides), it may generally be desirable for each sweep direction to be essentially parallel to a respective periphery portion.

In FIG. 6A, the beams B1-B3 form a v-scan in the X direction and a single scan in the Y direction. In the illustrated example, the beams B1, B2 have equal but opposite angles to the normal of the sweep direction. The beam swept in the Y direction is orthogonal to its sweep direction. Thereby, as shown in FIG. 6B, the sensing area of the panel comprises a number of first sub-portions P1, in which each point of intersection is formed by two beams, and a central second sub-portion P2, in which each point of intersection is formed by three beams. In one specific embodiment, the beams B1-B3 are essentially equiangular within the second sub-portion P2. Such a beam arrangement maximizes the mutual angle between the beams. A large mutual angle may improve the precision of the detected touch locations, at least in some implementations. By "equiangular beams" is meant that, in each point of intersection, the main directions of the beams are equally distributed over 360°. In this example, as shown in FIG. 6C, the beams intersect with a mutual angle of 60°) ($\alpha 1=\alpha 2=30°$).

Although it may be desirable for the beams to be equiangular within the sensing area, such a beam arrangement may restrict the sensing area to the central portion of the panel (cf. sub-portion P2), whereas the remainder of the total panel surface is wasted. Thus, the footprint of the touch-sensing system may become excessive in relation to the size of the sensing area.

However, as indicated above, there are sub-portions (cf. sub-portion P1) outside the central portion that are swept by two beams, albeit not in an equiangular configuration. These sub-portions may also offer touch-sensitivity. However, the performance may differ between the central portion and these sub-portions, e.g. with respect to the precision that can be attained in the determination of the location of each object, as well as the number of simultaneous touches that can be discriminated. The overall performance of the system may be reduced by increasing the number of beams that are swept across the panel, but increasing the number of beams will also increase the number of sub-portions that are swept by a different number of beams. Thus, differences in performance may prevail across the panel. Furthermore, it may be desirable to avoid sweeping more than about 6-10 beams across the panel. As the number of beams increases, so does the cost, the technical complexity and possibly the footprint of the system. Furthermore, since the sampling rate of the processing system is normally constant at a certain price point, increasing the number of beams will decrease the number of samples per beam sweep. It is also possible that the measured signal level for each sample decreases with an increased number of beams.

Figure 7A:
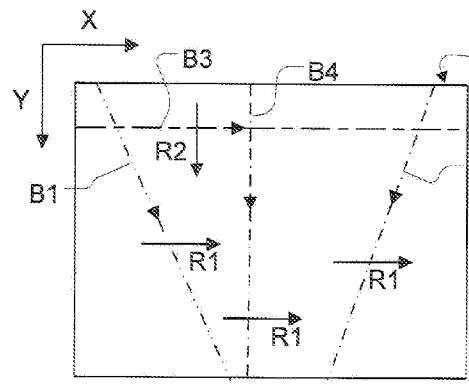
FIGS. 7A-7B are top plan views of still another embodiment, with FIG. 7A illustrating a beam arrangement and FIG. 7B illustrating the location of different sensing portions.
Figure 7B:
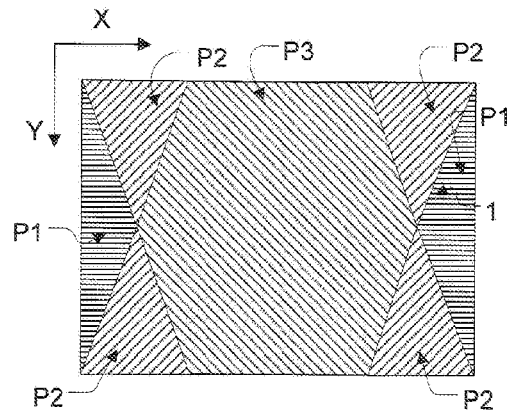

FIG. 7A illustrates a variant of the embodiment in FIG. 6A, in which one further beam B4 is additionally swept in the X direction. In the illustrated example, this beam is orthogonal to its sweep direction R2, and thus parallel to a pair of opposite sides of the panel, whereby the sensing area is extended to the entire panel 1. As shown in FIG. 7B, the sensing area comprises two first sub-portions P1, in which each point is swept by two beams, and four adjacent second sub-portions P2, in which each intersection point is formed by three beams, as well as a central third sub-portion P3, in which each intersection point is formed by four beams. In this embodiment, the equiangular beams are supplemented by an additional beam B4 in order to expand the extent of the sensing area. This expansion is achieved by sweeping a combination of a v-scan (B1 and B2) with an orthogonal beam (B4) in one direction across the panel. This combination of beams is denoted "Ψ-scan" in the following. It should also be noted, by comparing FIG. 7B and FIG. 6B, that the overall performance of the panel has been increased since all sub-portions are swept by a greater number of beams. However, there may still be differences in performance across the panel.

Figure 8A:
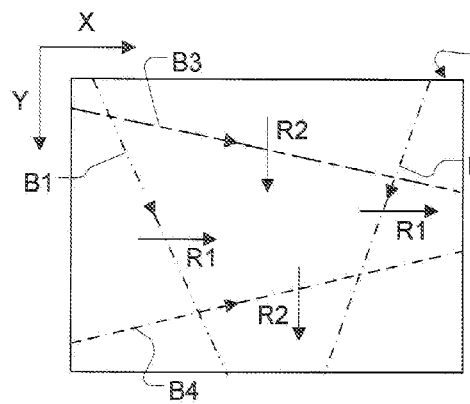
FIG. 8A is a variant of the embodiment in FIG. 4 resulting in a dual v-scan beam arrangement.
Figure 8B:
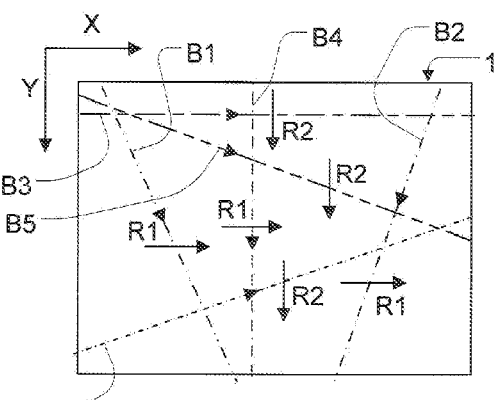
FIG. 8B is a variant of the embodiment in FIG. 7 resulting in a dual Ψ-scan beam arrangement.

FIG. 8A illustrates a variant of the embodiment in FIG. 4, wherein each of the X and Y directions is swept by two mutually non-parallel beams, i.e. a v-scan, and FIG. 8B illustrates a variant of the embodiment in FIG. 7, wherein each of the X and Y directions is swept by two mutually non-parallel beams and an orthogonal beam, i.e. a Ψ-scan.

Figure 9:
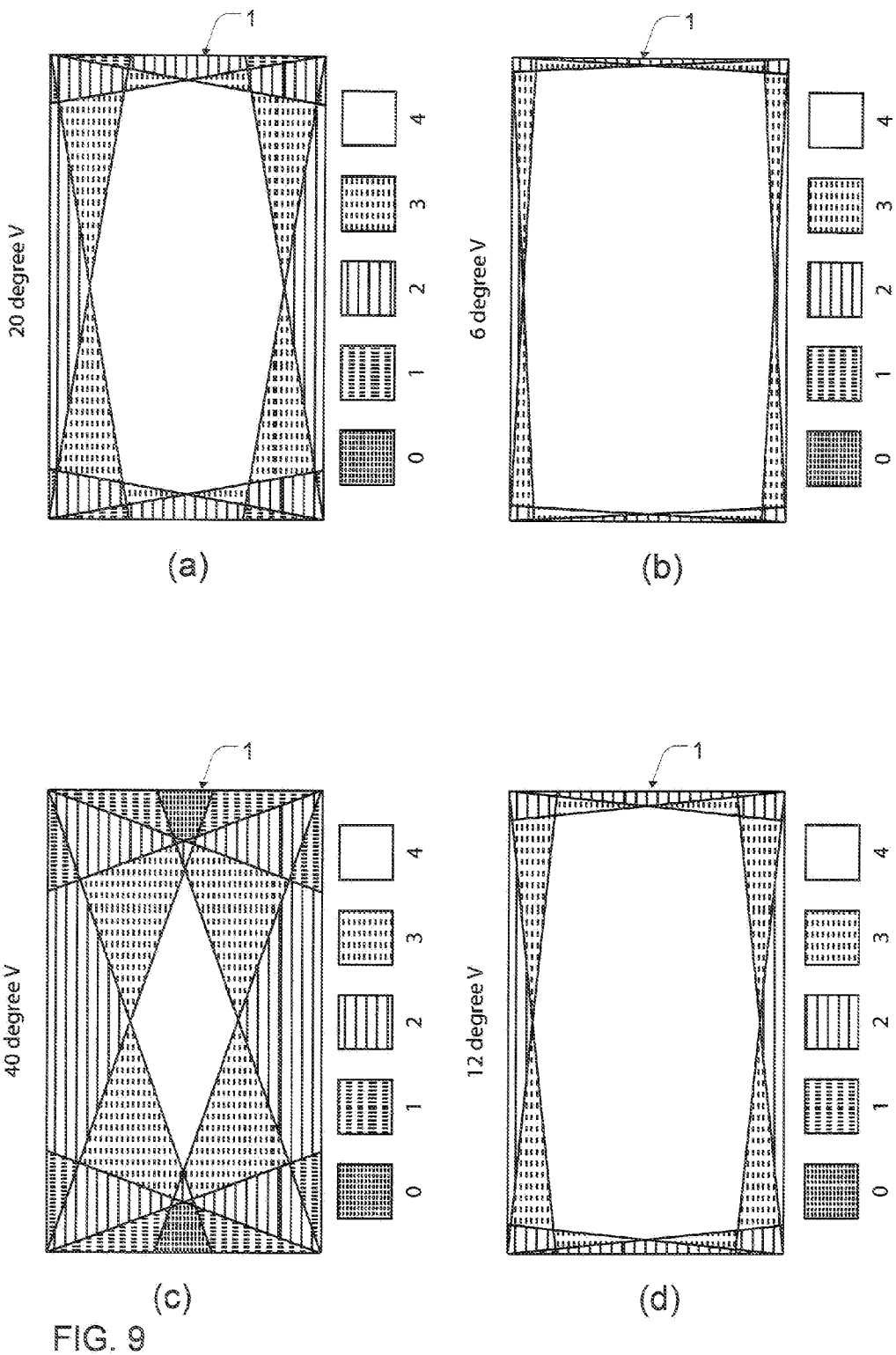
FIG. 9 illustrates the location of different sensing portions in an embodiment with a dual v-scan beam arrangement for mutual beam angles of 6°, 12°, 20° and 40°.

FIG. 9 illustrates the location of different sub-portions on a rectangular panel swept by four beams in the dual v-scan configuration shown in FIG. 8A. Specifically, FIG. 9 shows how the extent and location of these sub-portions changes when a different mutual angle is set up between the beams in each v-scan (i.e. the angle between beams B1 and B2, and between beams B3 and B4, respectively in FIG. 8A). At a mutual beam angle of about 20° (FIG. 9(a)), a major part of the panel is swept by four beams. Thus, the performance of the system is the same over a large part of the panel. Reducing the mutual beam angle further, increases the extent of the central sub-portion and decreases the size of the other sub-portions. At an angle of about 12°-15° (cf. FIG. 9(d)), there are essentially no sub-portions that are swept by less than two beams, and thus the entire panel is touch-sensitive. At an angle of about 2°-8° (cf. FIG. 9(b)), the entire panel can be considered to present an essentially uniform performance. Although the performance of the system is reduced as the mutual angle is decreased, it has been found that adequate performance can be achieved at mutual acute angles from about 2° up to about 30°.

Figure 10:
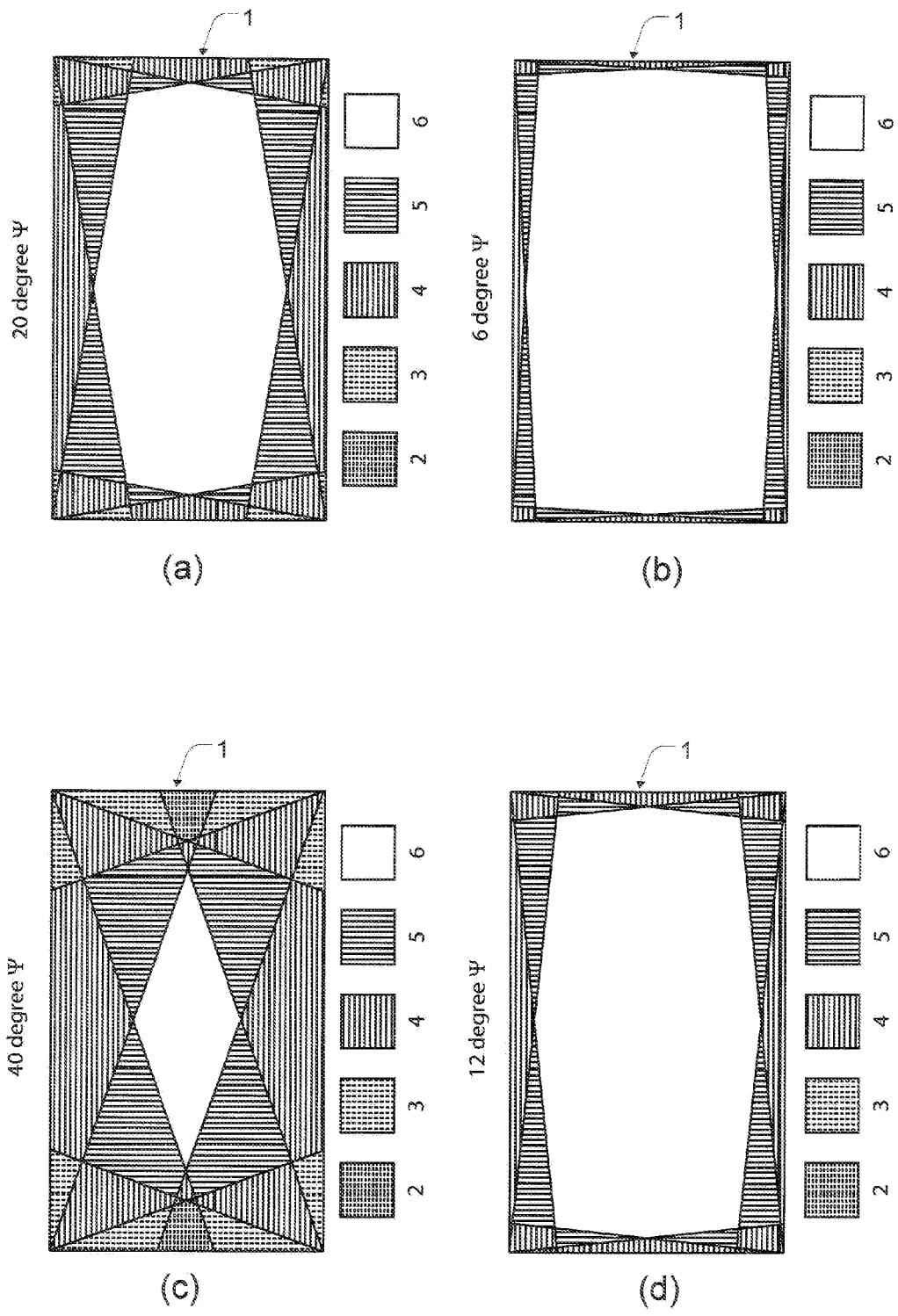
FIG. 10 illustrates the location of different sensing portions in an embodiment with a dual Ψ-scan beam arrangement for mutual beam angles of 6°, 12°, 20° and 40°.

FIG. 10 illustrates the location of different sub-portions on a rectangular panel swept by six beams in the dual Ψ-scan configuration shown in FIG. 8B. FIG. 10 shows the influence of the maximum mutual angle between the beams in each Ψ-scan (i.e. the angle between beams B1 and B2, and between beams B5 and B6, respectively in FIG. 8B). The distribution and size the sub-portions do not differ between FIG. 10 and FIG. 9. However, with a dual Ψ-scan, each sub-portion is swept by two more beams, which serves to increase the performance of the system. For example, the ability of the system to detect multiple touches is enhanced, and already at a mutual angle of about 12°-15° (cf. FIG. 10(d)), there are essentially no sub-portions that are swept by less than four beams.

Generally, a v/Ψ-scan involves sweeping at least one set of mutually acute beams in a given sweep direction across the panel, wherein the beams included in the set have a maximum mutual acute angle of ≦30°, and preferably ≦20°. In a v-scan, there are two beams in each set, and in a Ψ-scan there are three beams in each set. In a Ψ-scan, the main direction of one of these beams is preferably orthogonal to the sweep direction.

One benefit of having the central beam in a Ψ-scan orthogonal to the sweep direction is that the central beam will be swept over the whole panel, at least if panel is rectangular. Compared to a dual v-scan, the two central beams of a dual Ψ-scan may be swept across the entire panel, and this may result in a significant improvement in performance at the periphery of the panel.

A general advantage of using v- and Ψ-scans is that suitable performance of the touch-sensing system can be attained by sweeping only a few beams across the panel. Furthermore, both v- and Ψ-scans can be realized by space-efficient, simple and robust combinations of components. Detailed examples of such realizations will be described in detail below with reference to FIGS. 13-18.

It has surprisingly been found that an asymmetric beam arrangement may enable determination of a greater number of touch locations for a given number of beams, and/or improve the robustness in determining touch locations. Such an asymmetric beam arrangement may be obtained by arranging at least three beams such that each pair of beams defines a unique mutual acute angle. For example, each pair of beams in a set of beams forming a Ψ-scan may have a unique mutual acute angle. In another variant, an asymmetric beam arrangement is obtained by arranging at least two beams such that they have different angles to a common sweep direction (e.g. $\alpha1 \neq \alpha2$ in FIG. 4).

Figure 8C:
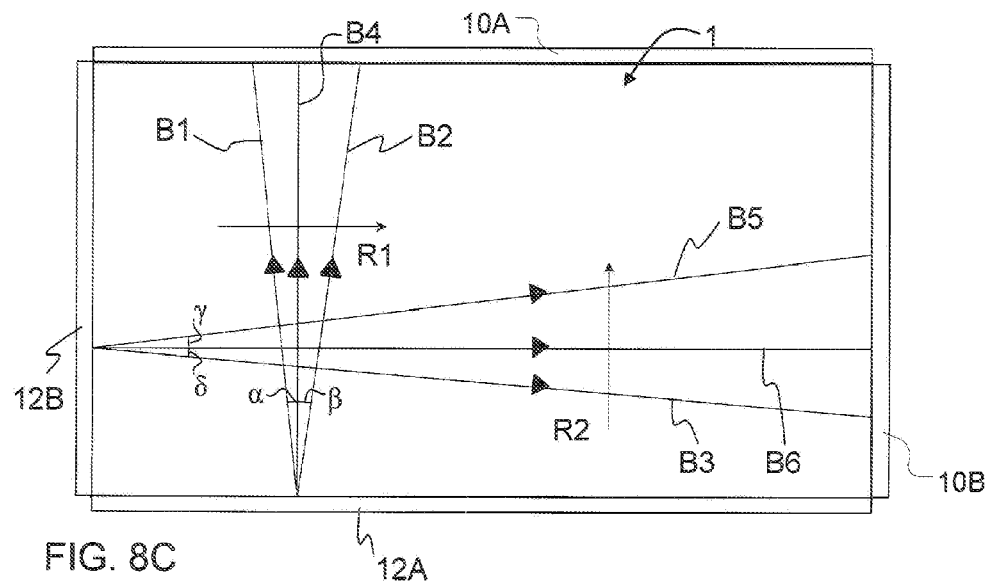
FIG. 8C illustrates an asymmetric dual Ψ-scan beam arrangement.

FIG. 8C illustrates a dual Ψ-scan arrangement that may be asymmetric by proper choice of mutual acute angles between the beams B1-B6. In the terminology of FIG. 8C, the mutual acute angles are given by $\alpha$, $\beta$ and $(\alpha+\beta)$ in one set of beams (B1, B2 and B4), and by $\gamma$, $\delta$ and $(\gamma+\delta)$ in the other set of beams (B3, B5 and B6). Thus, a suitable asymmetric beam arrangement is obtained when a $\alpha \neq \beta$ and/or $\gamma \neq \delta$. The asymmetric properties may be improved further by selecting a $\alpha \neq \beta \neq \gamma \neq \delta$, and even further by selecting $\alpha \neq \beta \neq \gamma \neq \delta \neq (\alpha+\beta) \neq (\gamma+\delta)$. An even more asymmetric beam arrangement is obtained when $\alpha$, $\beta$, $\gamma$ and $\delta$ are selected such that all mutual acute angles defined between the beams B1-B6 are unique. In one such non-limiting example, $\alpha=6°$, $\beta=8°$, $\gamma=7°$ and $\delta=5°$. If the panel is rectangular, with mutually opposite long sides and short sides, the asymmetric properties may be chosen such that the set of beams (B3, B5 and B6) that is swept orthogonally to the long sides of the panel (i.e. in direction R2) has a smaller maximum acute mutual acute angle than the other set of beams (B1, B2 and B4), i.e. $(\gamma+\delta)<(\alpha+\beta)$. Such a beam arrangement may increase the sensing area of the panel compared to other asymmetric dual Ψ-scan arrangements.

Figure 11A:
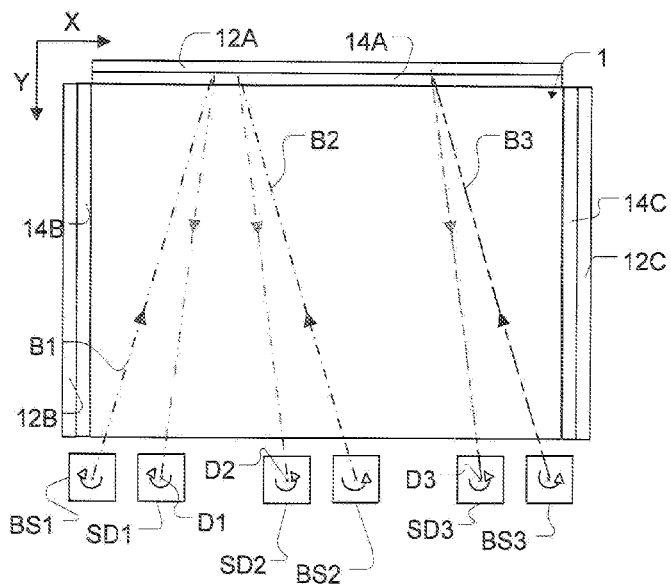
FIG. 11A is a top plan view of yet an embodiment with angular beam scan.

In yet another alternative embodiment, beams are swept angularly across the sensing area and around a respective axis of rotation ("angular scan"). FIG. 11A illustrates an example of such an embodiment, in which three beam scanners BS1-BS3 are arranged along one side of the panel 1 to inject a respective beam B1-B3 into the panel 1 and to sweep the beam across the sensing area. Re-directing elements 12A-12C are placed along the opposite sides of the panel 1 and configured to direct each beam B1-B3 from the panel 1 onto a fixed detection point D1-D3 while the beam is swept across the sensing area. Suitably, the beams B1-B3 only propagate through the sensing area between the beam scanners BS1-BS3 and the re-directing elements 12A-12C. Between the re-directing elements 12A-12C and the detection points D1-D3, the beams are transported outside the sensing area, e.g. beneath the panel. Similarly to FIG. 1, the scanning detectors SD1-SD3 are synchronized in pairs with the beam scanners BS1-BS3 and arranged to measure the energy of the incoming beam B1-B3 in the detection point D1-D3. It should also be realized that the placement of the scanning detectors SD1-SD3 is determined by the location of the detection points, as set by the re-directing elements 12A-12C. Thus, by varying the configuration of the re-directing elements, many alternative placements of the scanning detectors are conceivable.

Figure 11B:
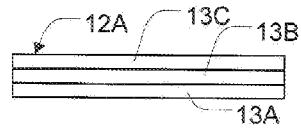
FIGS. 11B-11D are front views of re-directing elements included in the embodiment of FIG. 11A.
Figure 11C:
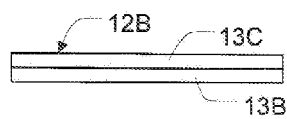
Figure 11D:
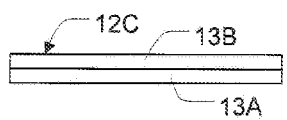

FIGS. 11B-11D are front views of the re-directing elements 12A-12C in FIG. 11A. Element 12A comprises one dedicated re-directing portion 13A-13C for each beam B1-B3, with portion 13A being designed to redirect beam B1 onto detection point D1, portion 13B being designed to redirect beam B2 onto detection point D2, and portion 13C being designed to redirect beam B3 onto detection point D3. Elements 12B, 12C comprise corresponding portions configured to redirect beams B2, B3 and B1, B3, respectively. The redirecting portions 13A-13C extend along the edges of the panel 1 and are arranged on different heights in the depth direction of the panel. The system in FIG. 11A also comprises coupling elements 14A-14C which are arranged intermediate the panel 1 and the re-directing elements 12A-12C and configured to direct each of the beams B1-B3 onto its corresponding portion 13A-13C. The redirection may be achieved by placing correctly angled minors at each position along the edge. In practice, this can be done with a specially molded plastic component that is transformed into a multifaceted minor by applying a reflective coating such as gold or aluminum to one side of the plastic component. It is also possible, if the angles of the mirrors allow it, to use the surfaces of the plastic component itself as TIR mirrors. It is to be understood that the sensing area needs to be swept by at least two beams to allow for the location of a touching object to be determined, and that the precision of this determination may be increased by increasing the number of beams.

Although touch-sensing systems with angular scan are viable, it is currently believed that touch-sensing systems with beam translation (such as those in FIGS. 1-8) provide certain advantages. For one, the complexity of the components required to direct each beam onto a common detection point may be reduced. Furthermore, with a pure translation, the sweep speed is constant along the beam which may facilitate the analysis of the resulting measurement signals S1, S2. Still further, with an angular scan, an object that touches the panel close to a beam scanner will interact with the beam during a major part of the sweep. This means that part of the injected radiation will be absorbed/scattered over a major part of the beam sweep, thereby reducing the system's ability to detect the location of one or more further objects touching the panel. This drawback of distance dependent beam interaction is overcome when each beam is translated with an invariant main direction across the sensing area.

In all embodiments, the touch-sensing system may include a transportation device which is arranged underneath the panel to define a confined light guiding channel between the beam scanner and the beam injection site on the panel, and/or between the beam out-coupling site on the panel and the scanning detector. The use of such a transportation device makes it possible to gather the bulk of components at one or a few sides of the panel.

Figure 12A:
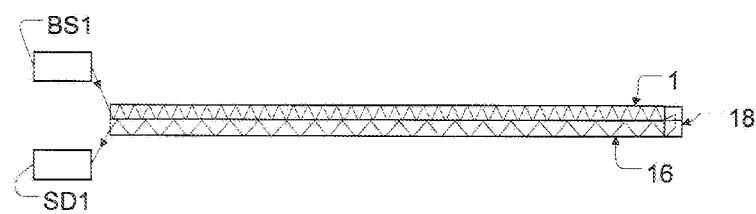
FIGS. 12A-B are elevated side views of embodiments that include a transportation plate underneath the touch-sensitive panel.
Figure 12B:
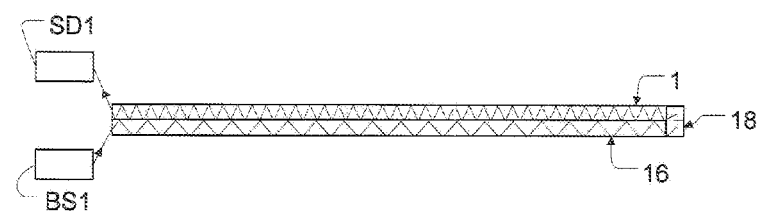

FIGS. 12A and 12B illustrate examples of embodiments in which a transportation plate 16 is arranged underneath the panel 1. The transportation plate 16 may be spaced from the panel 1, e.g. to accommodate for an interface device to be placed between the panel 1 and the plate 16. Alternatively, the plate 16 may be placed in contact with the panel 1, or may be formed as an integrated layer in the panel 1. In FIG. 12A, the transportation plate 16 is arranged to guide the beams of radiation (only one shown) from the panel 1 to the scanning detectors (only one shown). In FIG. 12B, the transportation plate 16 is arranged to guide the beams of radiation from the beam scanners (only one shown) to the injection site on the panel 1. In both examples, the system includes a beam folding device 18 that directs the beams from the panel 1 into the transportation plate 16 (FIG. 12A) and from the transportation plate 16 into the panel 1 (FIG. 12B). The use of a transportation plate provides a system which is simple, robust and easy to assemble. The beams may be confined within the plate 16 by total internal reflection, and/or by the plate 16 being coated with one or more reflecting layers. Although not shown, it is to be understood that the system may comprise further components, such as the above-mentioned re-directing elements 10 and beam-directing elements 12. In alternative embodiments, the system may comprise more than one transportation device. For example, the individual beams may be guided in separate transportation devices, or the system may include one or more transportation devices for guiding the beams to the panel and one or more transportation devices for guiding the beams from the panel. Other types of transportation devices may alternatively be used, such as optical fibres.

Implementation Details

Below follows an exemplifying description of specific implementations of the above embodiments, using a v-scan beam arrangement. It is to be understood, though, that similar implementations could be used for providing other beam arrangements, such as the above-mentioned Ψ-scan.

Figure 13:
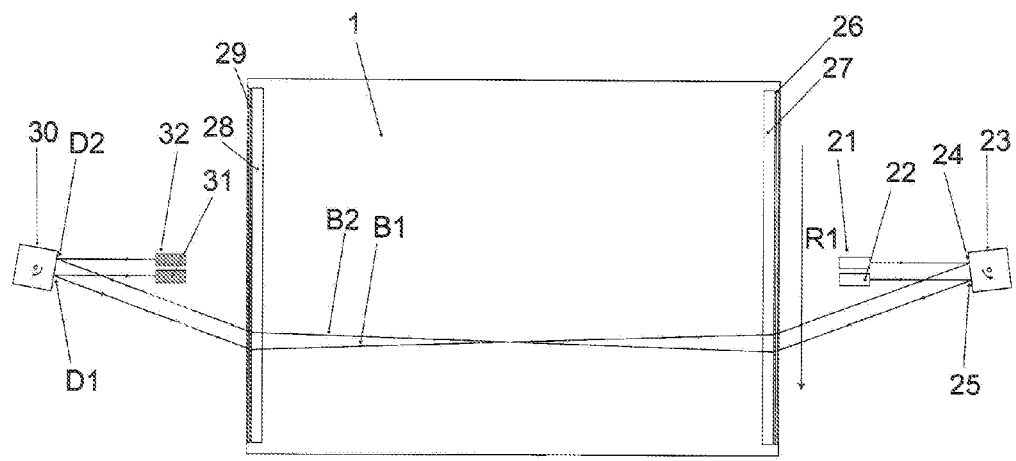
FIG. 13 is a top plan view of another embodiment.

FIG. 13 shows a touch-sensing system in which beams B1, B2 are emitted by stationary emitters 21, 22 which can be lasers, VCSELs (Vertical-Cavity Surface-Emitting Lasers), LEDs (Light-Emitting Diodes) or any other radiation source, or combination of radiation source and wavelength filter, capable of emitting radiation in a required wavelength band. After being emitted, beams B1, B2 hit a minor 23 to generate two virtual sources 24, 25. When the mirror 23 turns in the direction of the arrow around its axis of rotation, two scans are generated in the sweep direction R1. The beams B1, B2 travel from the virtual sources 24, 25 through a re-directing lens device 26. The lens device 26 has its focal point between the virtual sources 24, 25, and thus the displacement of the virtual sources 24, 25 creates an angle between the beams B1, B2. The angle between the beams B1, B2 depends on the distance between the virtual sources 24, 25. In one example, the lens device 26 is implemented in the form of one or more Fresnel lenses. The use of Fresnel lenses may be advantageous to reduce the footprint of the system. The lens device 26 is configured such that the main directions of the beams B1, B2 leaving the lens device 26 are unchanged while the beams are swept along the lens device 26 in the sweep direction R1. After the beams B1, B2 have passed through the lens device 26 they enter a coupling element 27 which guides the beams B1, B2 into the panel 1 in which they propagate by total internal reflection (TIR) until they exit the panel 1 via a coupling element 28 and a beam-directing lens device 29. Typically, the sweep starts at the upper end of the lens device 26 and stops at the lower end of the lens device 29. The lens device 29 may be similar to lens device 26 and configured to direct the beams B1, B2 onto a respective virtual detection point D1, D2 on a mirror 30. The minor 30 is rotated around its axis of rotation in the direction of the arrow in synchronization with the minor 23, such that the virtual detection points D1, D2 are fixed in space. The beams B1, B2 are reflected at the virtual detection points D1, D2 and detected by a respective stationary detector 31, 32. Thus, the detectors 31, 32 as well as the emitters 21, 22 are fixed in space, while the beams B1, B2 are swept across the panel 1 in the sweep direction R1. This is achieved by mutually synchronizing the rotating mirrors 23, 30.

In the embodiment of FIG. 13, the mirrors 23, 30 are placed outside the perimeter of the panel 1. This might be undesirable, e.g. if the touch-sensing system is to be integrated with a display device, such as an LCD (Liquid Crystal Display), a plasma display, an OLED (Organic Light-Emitting Diode) display or similar. If components of the touch-sensing system are arranged far from the perimeter of the display, the surface area the complete system may become undesirably large.

Figure 14A:
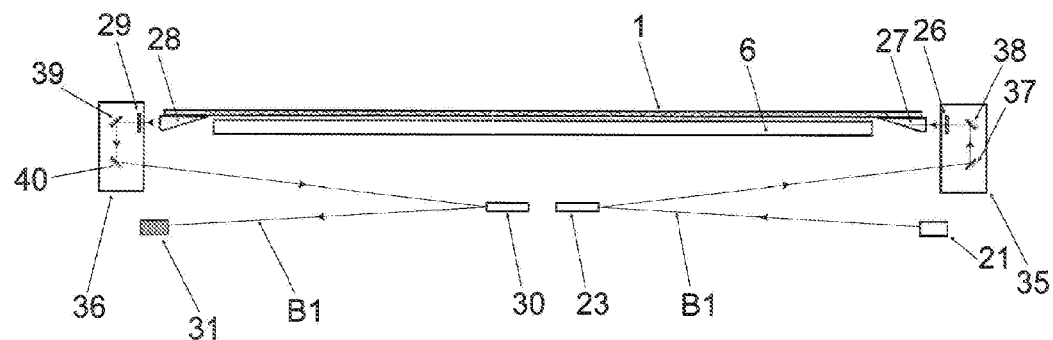
FIGS. 14A-14B are elevated side and top plan views, respectively, of an embodiment with folded beam paths.

FIG. 14A is an elevated side view of an alternative embodiment in which the beam paths are folded, allowing the minors 23, 30 to be placed underneath the panel 1 and the display device 6. The system comprises two folding systems 35, 36 which are arranged on opposite sides of the panel 1. The panel 1 is placed on top of the display device 6, and the coupling elements 27, 28 are attached to the panel 1, e.g. with optically clear glue or any other kind of suitable adhesive. In the system of FIG. 14, beam B1 is emitted from emitter 21 to hit rotating mirror 23, which reflects beam B1 towards the folding system 35. After entering the folding system 35, beam B1 is first reflected in stationary minor 37 and thereafter in stationary minor 38, whereby the beam B1 is folded into the plane of the panel 1. The folded beam B1 then passes through the lens device 26 and enters the panel 1 via the coupling element 27. The beam B1 propagates through the panel 1 by TIR and exits the panel 1 via the coupling element 28. Thereafter, the beam B1 enters the folding system 36 wherein it passes through the lens device 29, is reflected in stationary minors 39, 40, whereby the beam B1 is again folded beneath the panel 1. The beam B1 thereafter exits the folding system 36 and is reflected in the rotating mirror 30 which is synchronized with the rotating mirror 23, whereupon the beam B1 is detected by the detector 31.

Figure 14B:
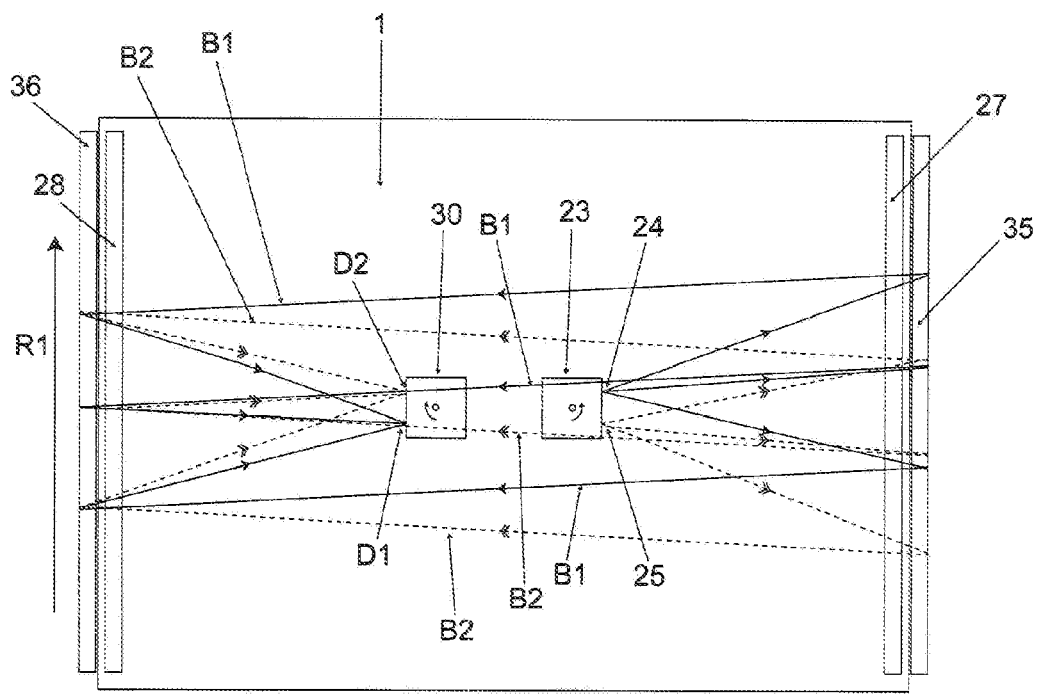

FIG. 14B is a top plan view of the system in FIG. 14A. To simplify the illustration, the emitters 21, 22 and the detectors 31, 32 have been omitted from the figure. FIG. 14B includes three snapshots of the beams B1, B2 as they are swept across the panel 1 in the sweep direction R1.

If desired, the system of FIG. 14 can be extended to a Ψ-scan system by adding a third virtual source in between the two virtual sources 24, 25.

Figure 15:
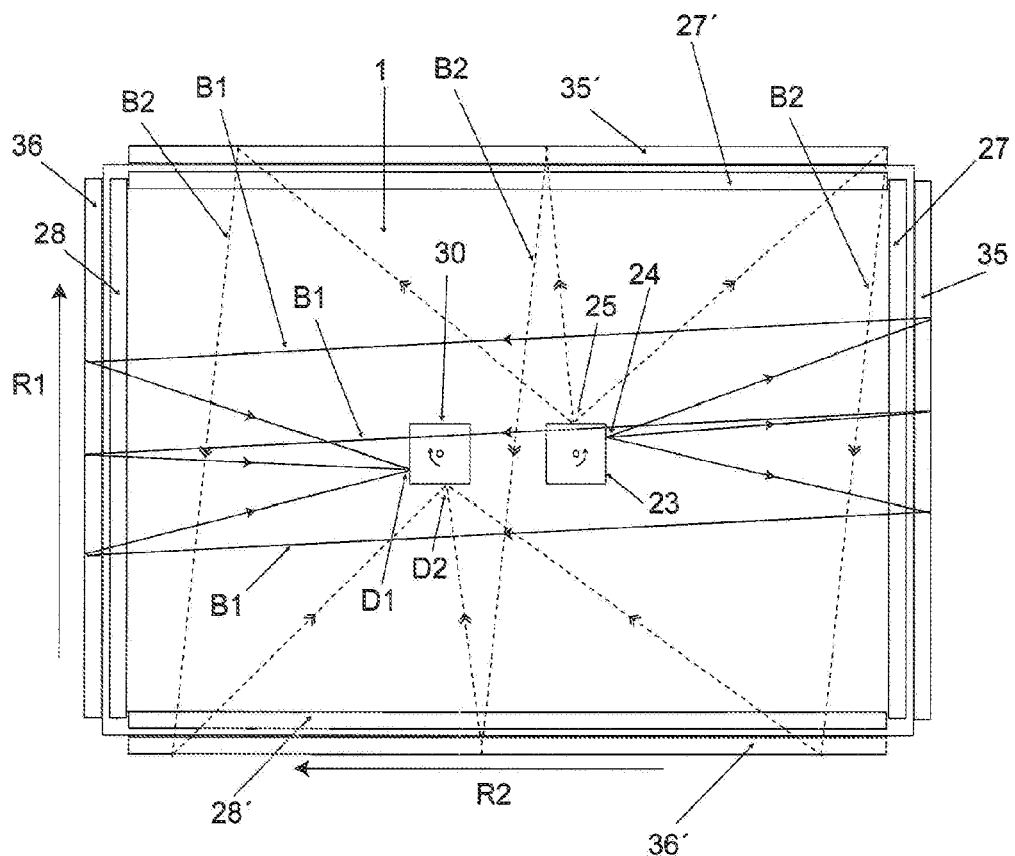
FIG. 15 is a top plan view of another embodiment with folded beam paths.

FIG. 15 is a top plan view of another embodiment of a v-scan configuration with synchronized scanners and folded beams. Like in FIG. 14B, the emitters 21, 22 and the detectors 31, 32 have been omitted for clarity of presentation. This embodiment utilizes the same arrangement of components for guiding and sweeping beam B1 in sweep direction R1 as the embodiment in FIG. 14, and this description therefore will not be repeated. The system in FIG. 15 further comprises an arrangement of components for sweeping the beam B2 in the sweep direction R2. At the virtual source 25 on mirror 23, beam B2 is reflected towards a folding system 35', which may have the same configuration as the folding system 35, which folds the beam B2 into the plane of the panel 1 and directs the beam through a re-directing lens device (not shown) corresponding to the lens device 26. The beam B2 enters the panel 1 via a coupling element 27', propagates through the panel 1 by TIR and exits the panel 1 via a coupling element 28'. Thereafter, the beam B2 enters a folding system 36', which may have the same configuration as the folding system 36, which directs the beam B2 through a beam-directing lens device (not shown) corresponding to the lens device 29 and folds the beam B2 underneath the panel 1. The beam B2 thereafter exits the folding system 36' and impinges on the virtual detection point D2 on mirror 30. Since the rotation of mirror 30 is synchronized with the rotation of mirror 23, beam B2 may be reflected off the mirror 30 onto a stationary detector (cf. detector 32 in FIGS. 13 and 14A).

It should be apparent to the skilled person that the system of FIG. 15 can be extended to generate a v-scan configuration in each of the sweep directions R1, R2, resulting in a beam arrangement of the type disclosed in FIG. 8A. Such extension involves adding a virtual source next to the virtual source 24 in the same way as in FIG. 14B, and adding a virtual source next to the virtual source 25 in a corresponding way. In a variant, such a system is created by using four rotating mirrors, synchronized in pairs, as is readily realized by the skilled person.

Figure 16A:
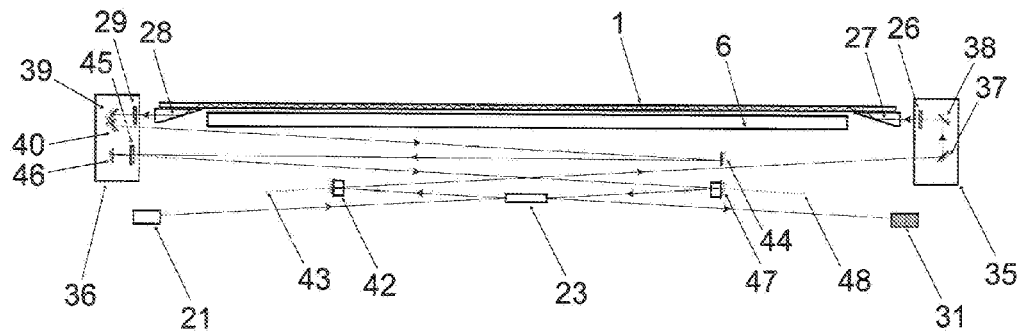
FIGS. 16A-16B are elevated side and top plan views, respectively, of yet another embodiment with folded beam paths.
Figure 16B:
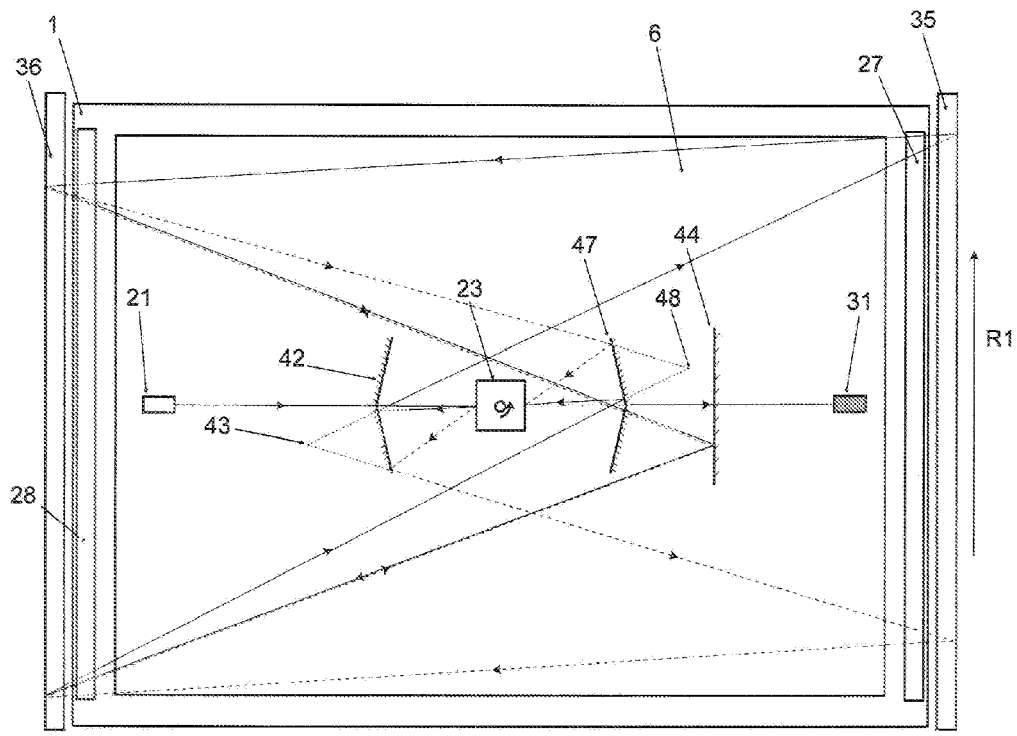

In order to optimize the cost of the touch-sensing system, it may be desirable to reduce the number of components in the system. FIGS. 16A-16B illustrate an embodiment in which the numbers of emitters, detectors and rotating mirrors have been reduced by 50%. As will be further described in the following, this reduction has been accomplished at the cost of four additional stationary mirrors and one additional lens device for each v-scan. However, the added components may be cheaper and less prone to errors than the emitters, detectors and rotating mirrors. To be specific, the most vulnerable component in the system is the rotating mirror; eliminating any number of rotating mirrors greatly reduces the risk of system failure. Furthermore, in the systems disclosed in FIGS. 13-15, the rotating mirrors 23, 30 need to be synchronized with a synchronizing system. In the system in FIGS. 16A-16B, one and the same rotating mirror is used both for sweeping the beams and for collecting the beams onto the detectors.

Looking at the beam path indicated by a solid line in the elevated side view of FIG. 16A and the top plan view of FIG. 16B, a beam is emitted from emitter 21 and is thereafter reflected in the rotating mirror 23, causing the beam to be swept over a first roof top mirror 42 creating two virtual sources, one for each part of the roof top mirror 42. For reasons of clarity only one virtual source 43 is shown. These virtual sources operate in the same way as the virtual sources 24, 25 in FIG. 14B, except that they are both created using only one emitter 21 and the roof top mirror 42. The beam continues towards and into folding system 35, is reflected in stationary mirrors 37, 38 and passes through lens device 26 before entering panel 1 via coupling element 27. The beam propagates through the panel 1 by TIR and exits the panel 1 via coupling element 28. Then, the beam enters folding system 36 where it passes through lens device 29 before being reflected in mirrors 39, 40. Thereafter, the beam is reflected in an inverting mirror 44 towards a lens device 45 and a mirror 46, which may or may not be arranged as part of the folding system 29. The beam passes lens device 45, is reflected in mirror 46, and once again passes through lens device 45. The beam is then reflected in a second roof top mirror 47. As the beam is swept over the roof top mirror 47, two virtual detection points are created. Again, to preserve clarity, only one virtual detection point 48 is shown. These virtual detection points operate in the same way as the virtual detection points D1, D2 in FIG. 14B. The beam then continues towards and is reflected in rotating mirror 23 and due to the effects of inverting mirror 44, lens device 45 and mirror 46, the sweep has now been inverted and the rotating mirror 23 is auto-synchronized with itself, whereby the beam is always hitting detector 31 which is fixed in space. Another beam path is shown by a dashed line in FIG. 16B, illustrating that the beam is translated across the panel 1 with an invariant main direction as the beam is swept across one part of the roof top mirror 42. The skilled person realizes that a full sweep across the roof top mirror 42, results in one beam being swept twice across the panel 1 in direction R1, forming a v-scan configuration.

If desired, the system of FIG. 16 can be extended to a Ψ-scan system by adding a third virtual source. For example, a Ψ-scan may be created by adding another facet to the roof top mirror 42. Thus, such a Ψ-scan system would have a mirror 42 with three facets.

Figure 17:
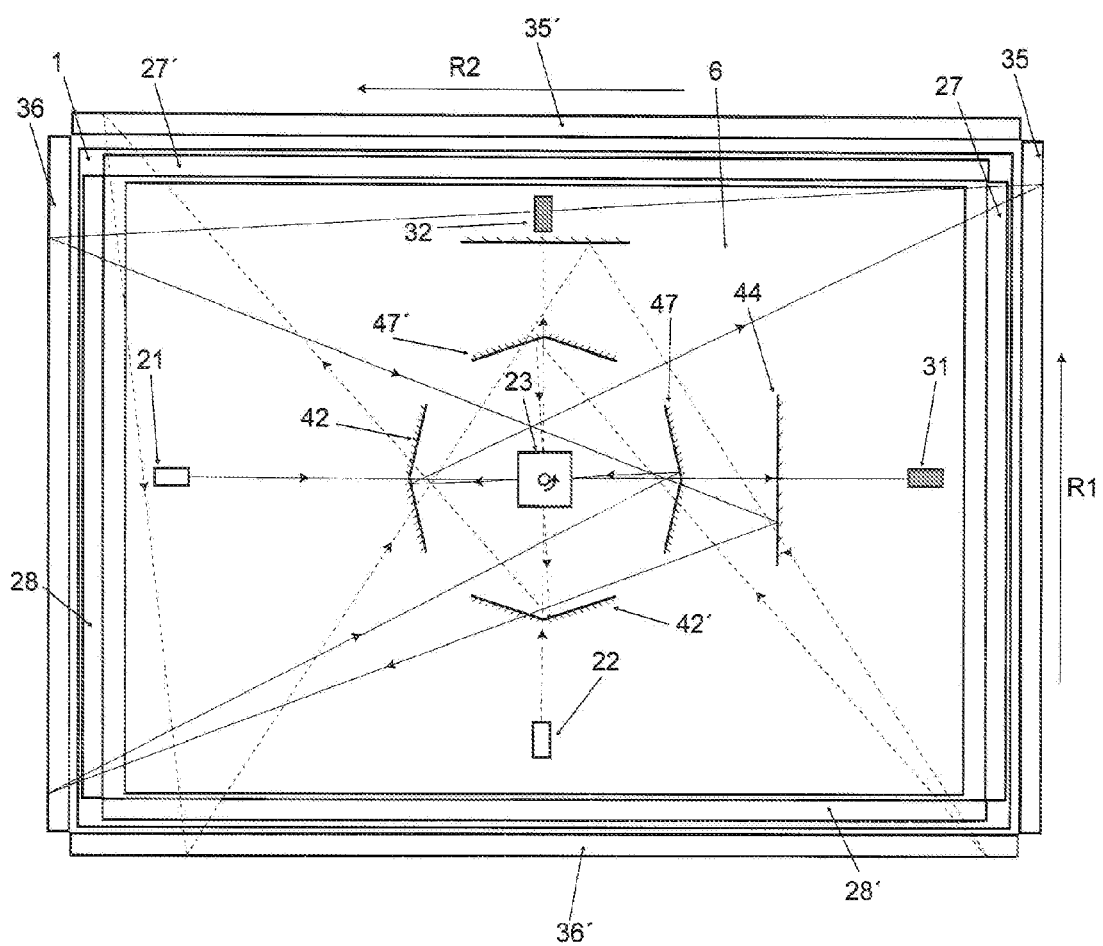
FIG. 17 is a top plan view of yet another embodiment with folded beam paths.

FIG. 17 is a plan view of a variant of the system in FIG. 16. Here, the system is configured to generate a v-scan in two sweep directions R1, R2. The virtual sources (not shown for clarity) are being created by roof top mirror 42 for sweep direction R1 and by roof top mirror 42' for sweep direction R2 Likewise the virtual detection points (not shown for clarity) are created by roof top mirror 47 for sweep direction R1 and by roof top mirror 47' for sweep direction R2. It should be noted that FIG. 17 only shows a snapshot of the beam path. As the beams from emitters 21, 22 are swept over the whole of roof top mirrors 42, 42', a full v-scan will be performed inside plate 10 in both directions R1, R2. Folding systems 35, 35' may be identical except for their length; likewise folding systems 36, 36' may be identical except for their length.

In certain applications, it may be desirable to reduce the thickness of the touch-sensing system. This is the case, e.g., if the touch-sensing system is to be incorporated in laptop computers, tablet computers, mobile terminals, PDAs and similar products. FIG. 18 illustrates an embodiment configured to allow for a reduced thickness. Specifically, the thickness of the system in this embodiment is determined by its thickest component, i.e. no components need to be stacked onto each other. Depending on the choice of components, the thickness of the system can range from a few tenths of a millimeter up to several centimeters.

Figure 18A:
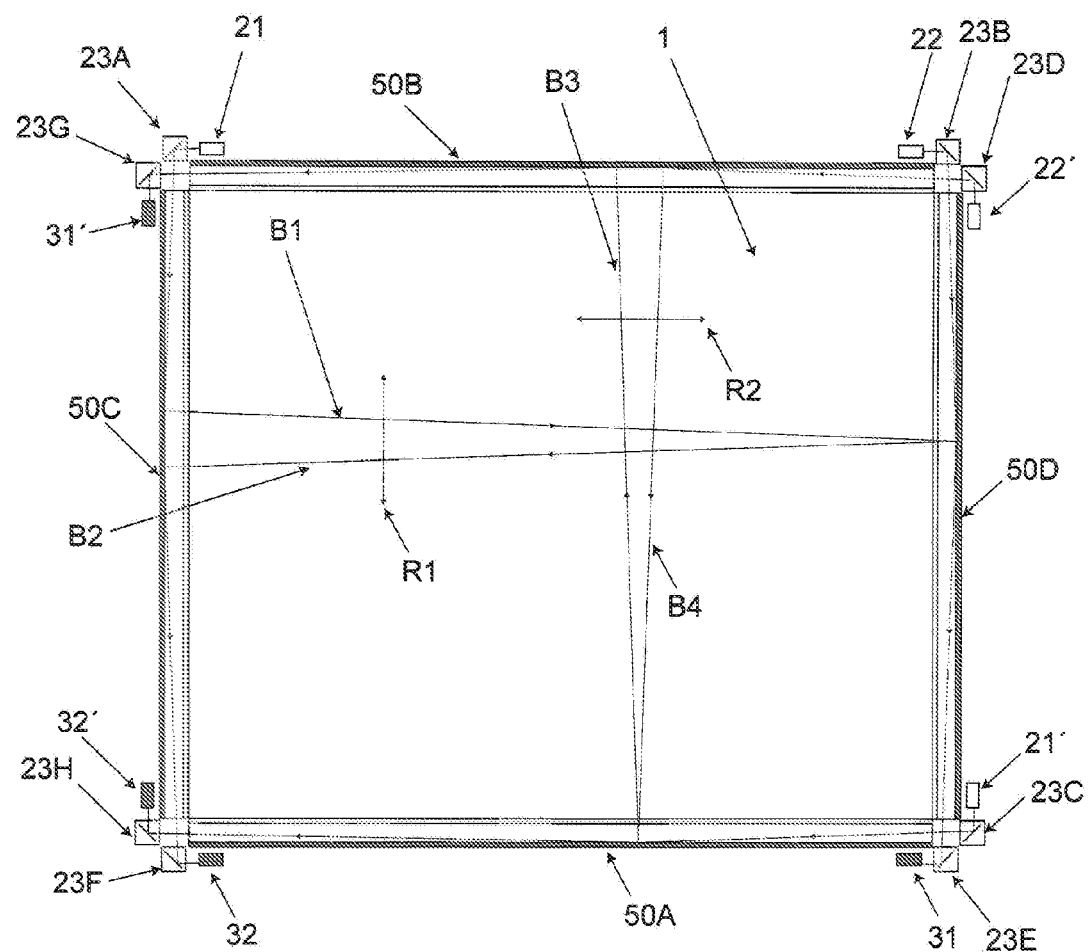
FIG. 18A is a top plan view of an embodiment with corner-located beam scanner and scanning detectors.
Figure 18B:
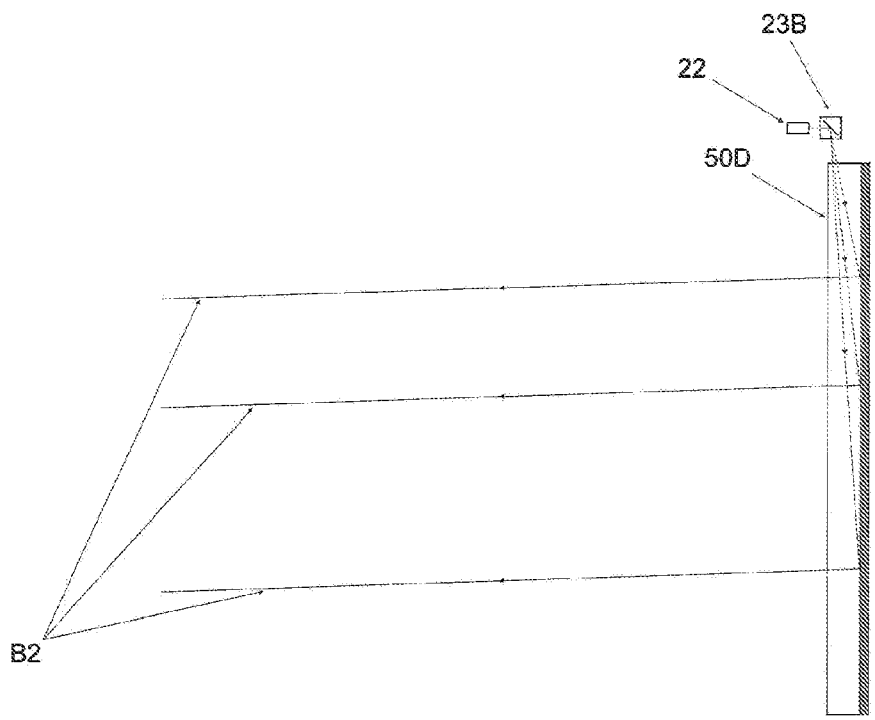
FIG. 18B shows a detail of the embodiment in FIG. 18A.
Figure 18C:
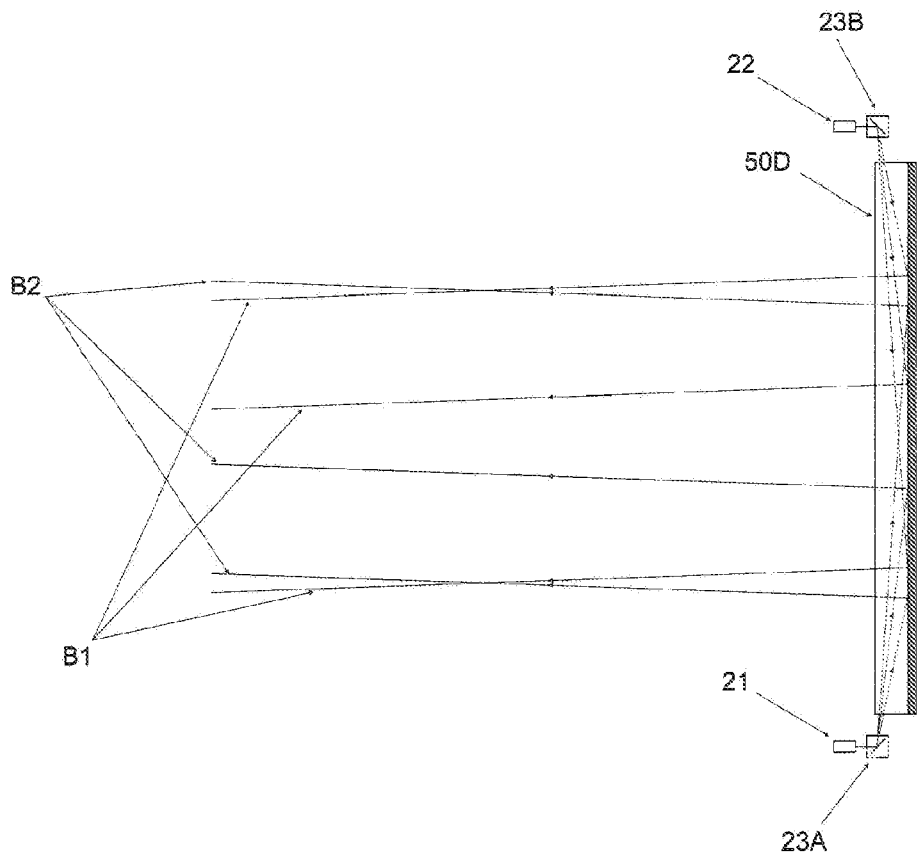
FIG. 18C shows a detail of an alternative embodiment.

The system of FIG. 18 has been designed to achieve a v-scan in two orthogonal directions R1, R2 across the panel 1. As shown in the plan view of FIG. 18A, the system thus comprises four emitters 21, 21', 22, 22' arranged to emit a respective beam of radiation, four detectors 31, 31', 32, 32' arranged to measure the energy of a respective beam, and eight movable deflection elements 23A-23H which are controllable to form synchronized pairs of beam scanners and scanning detectors in the system. Furthermore, four optical re-direction devices 50A-50D are fixedly arranged to extend along a respective periphery portion of the panel 1. Each optical redirection device 50A-50D may comprise a sequence of elements, wherein each element is designed to re-direct an incident beam from a given direction into a given outbound direction. In the illustrated example, each optical re-direction device 50A-50D is configured to re-direct the respective incoming beam B1-B4 in one and the same direction, thereby causing each beam B1-B4 to be swept across the panel 1 with an invariant main direction. Non-limiting examples of optical re-direction devices include diffractive optical elements (DOE), micro-optical elements, mirrors, refractive lenses and any combination thereof. The re-direction devices 50A-50D will be described in more detail with reference to FIGS. 18B-18C.

The touch-sensing system in FIG. 18A, operates by emitting a beam B1 from emitter 21 onto deflection element 23A which is operated to sweep the beam B1 from top to bottom of the optical redirection device 50C. The optical redirection device 50C is configured to redirect the beam B1 so that the beam B1 always has the same direction independently of where on the optical redirection device 50C the beam B1 hits. The beam B1 enters the panel 1 and propagates through panel 1 via TIR. The beam B1 exits the panel 1 and enters into the optical redirection device 50D which is configured to, irrespective of where on the optical redirection device 50D the beam B1 hits, always redirect the beam B1 towards the deflection element 23E. The movement of the deflection element 23E is synchronized (mechanically or electronically) with the deflection element 23A, causing the beam B1 to be deflected towards the radiation detector 31 during the entire beam sweep.

Similarly, beam B2 is generated by emitter 22 and guided by deflection element 23B, optical redirection device 50D, optical redirection device 50C, deflection element 23F onto radiation detector 32.

Similarly, beam B3 is generated by emitter 21' and guided by deflection element 23C, optical redirection device 50A, optical redirection device 50B, deflection element 23G onto radiation detector 31'.

Similarly, beam B4 is generated by emitter 22', and guided by deflection element 23D, optical redirection device 50B, optical redirection device 50A, deflection element 23H onto the radiation detector 32'.

Thereby, two v-scans are generated along the sweep directions R1, R2 in the panel 1.

The optical redirection device 50A-50D is further illustrated in FIG. 18B, which illustrates three snapshots/instances of beam B2, as emitted by emitter 22, while it is being swept by deflection element 23B across the optical redirection device 50D. The task of the optical redirection device 50D is to receive all instances of beam B2 that originate from the deflection element 23B and redirect them so that they become mutually parallel, as shown in FIG. 18B. Since ray paths are always reversible, it is clear that if the illustrated beam paths were to be reversed, they would all converge towards the deflection element 23B. After traversing the panel 1, the mutually parallel instances of beam B2 hit the optical redirection device 50C (FIG. 18A) which can be designed, similarly to the optical redirection device 50D, to cause all instances of beam B2 to converge onto the deflection element 23F. Based on knowledge of where on the optical redirection device 50C the instances are going to hit, deflection element 23F can be controlled to deflect all instances of beam B2 onto detector 32. For example, deflection element 23F may be synchronized with deflection element 23B which sweeps beam B2 along the optical redirection device 50D and thereby also sweeps beam B2 along optical redirection device 50C after it has passed through the plate 1. The optical redirection device 50A-50D can for example be a diffractive optical element (DOE).

In an alternative configuration of the embodiment in FIG. 18A, two of the optical redirection devices 50A-50D may be arranged and configured to operate on beams received from deflection elements at both ends of the optical redirection device, and two of the optical redirection devices 50A-50D may be arranged and configured to direct the incoming beams onto deflection elements at both ends of the optical redirection device. Part of such a configuration is shown in FIG. 18C, in which the paths of beam B1 are mutually parallel, the paths of beam B2 are mutually parallel, and both beams B1, B2 are redirected by optical redirection device 50D. In FIG. 18C, beams B1, B2 originate from emitters 22, 23, respectively, but due to the above-mentioned reversibility of the ray paths, either of the emitters 22, 23 can be replaced by detectors. Thus, this design principle results in the desired redirecting function of the optical redirection devices 50A-50D.

In either configuration, the optical redirection devices 50A-50D may be attached to the edges of panel 1 with an adhesive, which is optically clear (in the wavelength range used) so as to minimize any radiation loss in the interfaces between the panel 1 and the optical redirection devices 50A-50D. Alternatively, other mechanical solutions are readily available to the skilled person for attaching the optical redirection devices 50A-50D to the panel 1.

Determination of Touch Locations

Figure 19:
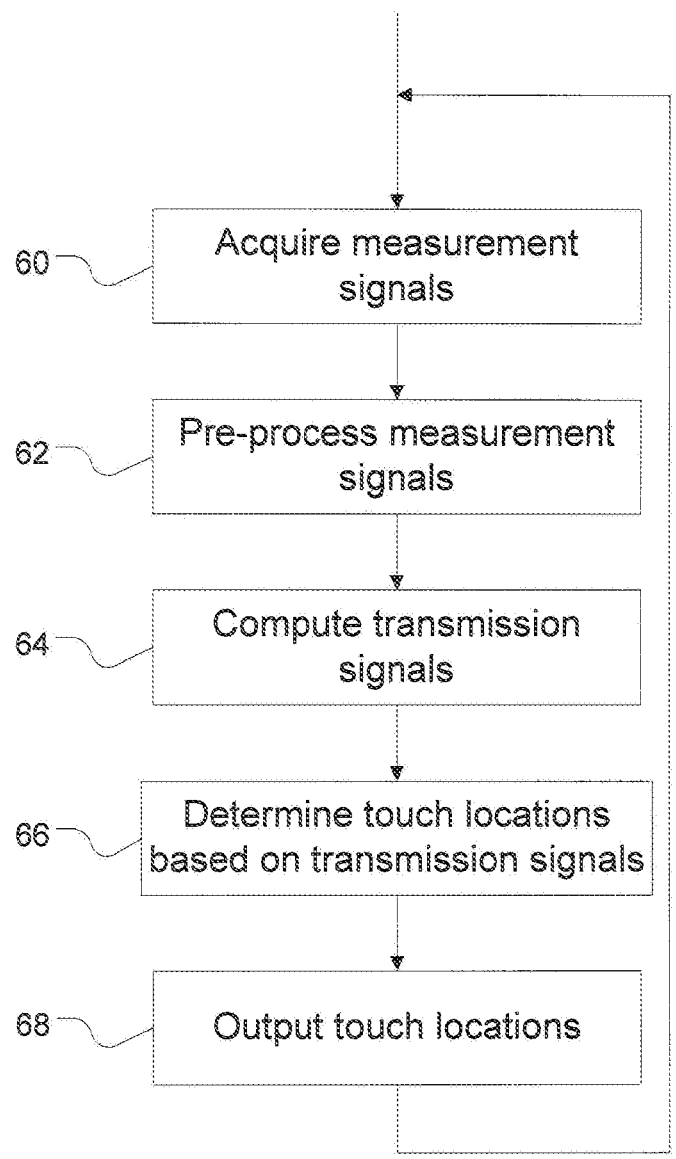
FIG. 19 is a flow chart of an exemplifying method for determining touch locations in a touch-sensing system.

In all of the above described embodiments, configurations, arrangements, alternatives and variants, a data processor (8 in FIG. 1A) may be configured to calculate the touch locations based on measurement signals derived from the scanning detectors. The skilled person will readily realize that there are numerous methods for determining the touch locations. FIG. 19 is a flow chart of one such exemplifying method.

In step 60, measurement signals are acquired from the scanning detectors in the system. Each measurement signal represents data from k different angles, sampled at N time intervals during a sensing instance.

In step 62, the measurement signals are pre-processed. For example, the measurement signals may be processed for noise reduction using standard filtering techniques, e.g. low-pass filtering, median filters, Fourier-plane filters, etc. Furthermore, if the energy of the emitted beams is measured in the system, the measurement signals may be compensated for temporal energy fluctuations in the beam scanners. Furthermore, the measurement signals may contain sensor readings from outside the region of interest, e.g. outside the sensing area of the panel. Thus, the measurement signals may be pre-processed by extracting relevant parts thereof. It may be desired to add one or more trigger points in the measurement signal to improve/facilitate the extraction of relevant data. Such a trigger point may indicate the start or stop of a beam sweep. Furthermore, the measurement signals may be rectified, i.e. converted to behave equidistant sampling distance in the panel coordinate system. Such a rectification may include interpolating each measurement signal with a non-linear angle variable, resulting in a data set with samples that are evenly distributed over the panel. Rectification is optional, but may simplify the subsequent computation of touch locations.

In step 64, a transmission signal is calculated for each pre-processed measurement signal, by dividing the measurement signal with a background signal. The background signal may or may not be unique to each detector or each measurement signal. The background signal may be pre-set, derived during a separate calibration step, or derived from measurement signals acquired during one or more preceding iterations. Optionally, the calculation of transmission signals may include calculating the logarithm of the ratios between the measurement and background signals.

In step 66, the touch locations are determined based on the transmission signals. The touch-sensing systems as described herein may be modeled using known algorithms developed for transmission tomography with either a parallel scanning geometry or a fan beam geometry. Thus, the touch locations may be reconstructed using any available image reconstruction algorithm, especially few-view algorithms that are used in, e.g., tomography. If the system involves scattering, the reconstruction suitably also takes into account the functional dependence between signal width and position along the panel (cf. FIG. 3).

The determination of touch locations in step 66 may thus involve identifying peaks in the transmission signals, while possibly also separating adjacent/overlapping peaks (cf. FIG. 2); reconstructing the beams that correspond to the identified peaks, and identifying candidate intersections between the reconstructed beams in the sensing area; computing an area value indicative of the (logarithmic) integrated area under each identified peak in the transmission signals, and setting up an equation system relating the candidate intersections to the area values; and then using e.g. linear programming to identify the most likely set of touches from the set of candidates. The accuracy and/or computation speed of step 66 may be increased by using a priori knowledge about the touch locations, e.g. by using information about the touch locations that were identified during preceding sensing instance(s).

To give a simplified example, based on the measurement signals in FIG. 2, the peaks in signal S1 may yield logarithmic areas a1, a2 and the peak in S2 may yield logarithmic area a3. Beam reconstruction may yield two intersections p1, p2, giving the equation system:

$$\begin{cases} p1 = a1 \\ p2 = a2 \\ p1 + p2 = a3 \end{cases}$$

In this particular example, the solution is trivial, but it should be realized that the provision of multiple touches and comparatively few beam sweeps may result in an equation system that has a number of possible solutions, or no solution, requiring the use of optimization methodology to derive the most likely set of touches.

After step 66, the determined touch locations are output and the method returns to step 60 for processing of a forthcoming sensing instance.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

The invention claimed is:

1. An apparatus for detecting a location of at least one object on a touch surface, said apparatus comprising:
   a panel defining the touch surface and an opposite surface;
   an input scanner arrangement adapted to introduce at least two beams of radiation into the panel for propagation by internal reflection between the touch surface and the opposite surface, and to sweep the beams along the touch surface across a sensing area of the panel;
   an output scanner arrangement which is synchronized with the input scanner arrangement so as to receive the beams from said input scanner arrangement while they are swept across the sensing area and to direct the beams onto at least one radiation detector;
   wherein said input and output scanner arrangements are configured to introduce and receive each beam on opposite ends of said sensing area;
   said apparatus further comprising a data processor connected to said at least one radiation detector and configured to identify said location based on an attenuation of said beams caused by the object touching the touch surface within said sensing area; wherein
   the output scanner arrangement comprises at least one fixed re-directing element configured to receive and re-direct each beam onto a respective common detection point while the beams are swept across the sensing area,
   the output scanner arrangement further comprises at least one movable deflection element which is arranged at said common detection point(s) and is controllable to deflect the beams onto said at least one radiation detector, and
   the input scanner arrangement comprises at least one movable beam-sweeping element which is controllable to sweep the beams across the sensing area.

2. The apparatus of claim 1, wherein the data processor is configured to identify said location based on one or more signals indicative of the attenuation of each beam while being swept across the sensing area.

3. The apparatus of claim 1, wherein said at least one re-directing element is arranged at the periphery of the panel.

4. The apparatus of claim 1, wherein said at least one deflection element is arranged underneath the panel, said output scanner arrangement further comprising an optical folding system for directing the beams from the plane of the panel to said at least one deflection element.

5. The apparatus of claim 1, wherein a single movable deflection element is arranged to deflect the beams onto said at least one radiation detector.

6. The apparatus of claim 1, wherein a single movable beam-sweeping element is arranged to sweep the beams across the sensing area.

7. The apparatus of claim 1, further comprising a control device for synchronizing the beam-sweeping element(s) of the input scanner arrangement and the deflection element(s) of the output scanner arrangement.

8. The apparatus of claim 1, wherein the beam-sweeping element and the deflection element of the input and output scanner arrangements are formed by a single movable element.

9. The apparatus of claim 1, wherein the input scanner arrangement further comprises at least one fixed beam-directing element which is arranged to receive the beams from the beam-sweeping element(s) and to cause the beams to have an essentially invariant main direction while being swept across the sensing area.

10. The apparatus of claim 9, wherein said at least one beam-directing element is arranged at the periphery of the panel.

11. The apparatus of claim 1, wherein said at least one beam-sweeping element is arranged underneath the panel, said input scanner arrangement further comprising an optical folding system for directing the beams from said at least one beam-sweeping element to the plane of the panel.

12. The apparatus of claim 1, wherein the input scanner arrangement is configured to sweep the beams by translating each beam across the sensing area.

13. The apparatus of claim 12, wherein said panel is defined by linear periphery portions, and each beam is translated in a direction which is essentially parallel to one of said linear periphery portions.

14. The apparatus of claim 1, wherein said beams are non-parallel within said sensing area.

15. The apparatus of claim 1, wherein the input scanner arrangement is configured to sweep the beams angularly across the sensing area and around a respective axis of scanning.

16. A method of detecting a location of at least one object on a touch surface, said method comprising:
- introducing at least two beams of radiation into a panel that defines the touch surface and an opposite surface, said beams propagating by internal reflection between the touch surface and the opposite surface;
- sweeping the beams along the touch surface across a sensing area of the panel;
- receiving the beams at an opposite end of the sensing area;
- directing, synchronously with said sweeping, each of the beams onto a respective common detection point;
- deflecting the beams from said common detection point(s) onto at least one radiation detector; and
- identifying said location based on an attenuation of said beams caused by the object touching the touch surface within said sensing area, said attenuation being identifiable from an output signal of the radiation detector.

17. A method of operating an apparatus for detecting a location of at least one object on a touch surface, said touch surface being part of a panel that defines the touch surface and an opposite surface, said method comprising:
- operating an input scanner arrangement to introduce at least two beams of radiation into the panel for propagation by internal reflection between the touch surface and the opposite surface, and to sweep the beams along the touch surface across a sensing area of the panel;
- operating an output scanner arrangement in synchronization with the input scanner arrangement to
  - receive the beams at an opposite end of the sensing area while the beams are swept across the sensing area,
  - direct the beams onto a respective common detection point while the beams are swept across the sensing area,
  - deflect the beams from the common detection point(s) onto at least one radiation detector; and
- identifying said location based on an attenuation of said beams caused by the object touching the touch surface within said sensing area, said attenuation being identifiable from an output signal of the radiation detector.

* * * * *